(12) United States Patent
Arcuri et al.

(10) Patent No.: US 7,819,292 B2
(45) Date of Patent: Oct. 26, 2010

(54) FLUID DISPENSING SYSTEM

(75) Inventors: Joseph F. Arcuri, Liverpool, NY (US);
Mark I. Cushman, Ilion, NY (US);
George A. Mitchell, Utica, NY (US);
Mario J. Restive, Frankfort, NY (US)

(73) Assignee: The Fountainhead Group, Inc., New York Mills, NY (US)

( * ) Notice: Subject to any disclaimer, the term of this patent is extended or adjusted under 35 U.S.C. 154(b) by 1097 days.

(21) Appl. No.: 11/342,918

(22) Filed: Jan. 30, 2006

(65) Prior Publication Data
US 2007/0175928 A1 Aug. 2, 2007

(51) Int. Cl.
*B67D 7/56* (2010.01)
(52) U.S. Cl. ............... 222/383.3; 222/400.8; 222/402; 222/530; 222/538; 417/547; 137/530; 251/89.5; 251/90
(58) Field of Classification Search ............. 222/383.3, 222/400.8, 401–402, 526–530, 538, 182; 239/280.5; 417/547; 137/533.17, 533.23, 137/528–530; 285/120.1, 356; 251/89–92, 251/95, 97, 113
See application file for complete search history.

(56) References Cited

U.S. PATENT DOCUMENTS

| | | | |
|---|---|---|---|
| 4,930,664 A * | 6/1990 | Ellison ........................... | 222/1 |
| 5,196,044 A | 3/1993 | Caulder et al. | |
| 5,469,993 A | 11/1995 | Hauf et al. | |
| 5,553,750 A | 9/1996 | Foster | |
| 5,609,272 A * | 3/1997 | Brass et al. ................. | 222/147 |
| 6,170,706 B1 | 1/2001 | Havlovitz | |
| 6,347,729 B1 * | 2/2002 | Spriegel ..................... | 222/529 |
| 6,367,665 B1 * | 4/2002 | Barriac et al. ............ | 222/383.3 |
| 6,554,207 B2 * | 4/2003 | Ebberts ...................... | 239/146 |
| 6,893,232 B2 * | 5/2005 | Wu ............................. | 417/547 |

* cited by examiner

*Primary Examiner*—Kevin P Shaver
*Assistant Examiner*—Andrew Bainbridge
(74) *Attorney, Agent, or Firm*—George R. McGuire; Bond Schoeneck & King, PLLC

(57) ABSTRACT

A fluid dispensing system includes a pump assembly for pressurizing a low cost container, the container non reversibly connected to a coupler module. A wand assembly is releasably connected to the coupler module. A discharge conduit fluidly connects the wand assembly to the container to displace a check valve in the pump assembly to permit flow from the pump assembly. The wand assembly includes a grip body slideable relative to the discharge conduit between a retracted storage position and an extended operable position.

18 Claims, 27 Drawing Sheets

FIGURE 13
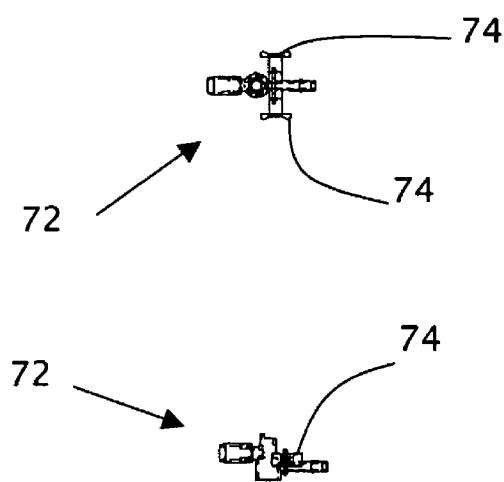
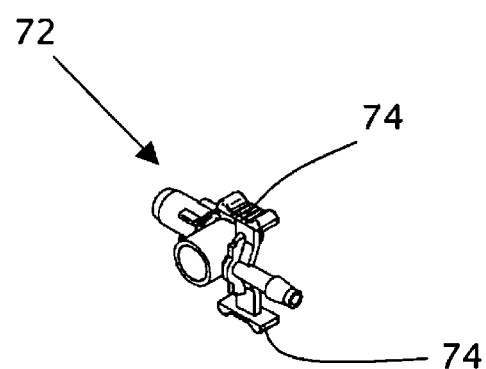
FIGURE 12
FIGURE 14

FIGURE 32
FIGURE 36
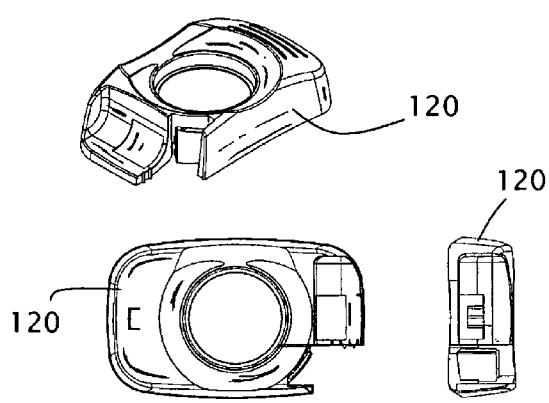
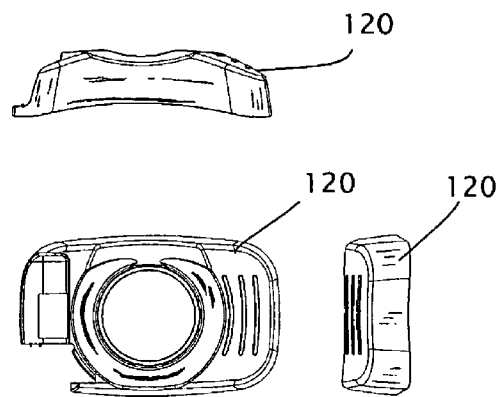
FIGURE 34    FIGURE 37    FIGURE 33    FIGURE 38
FIGURE 35

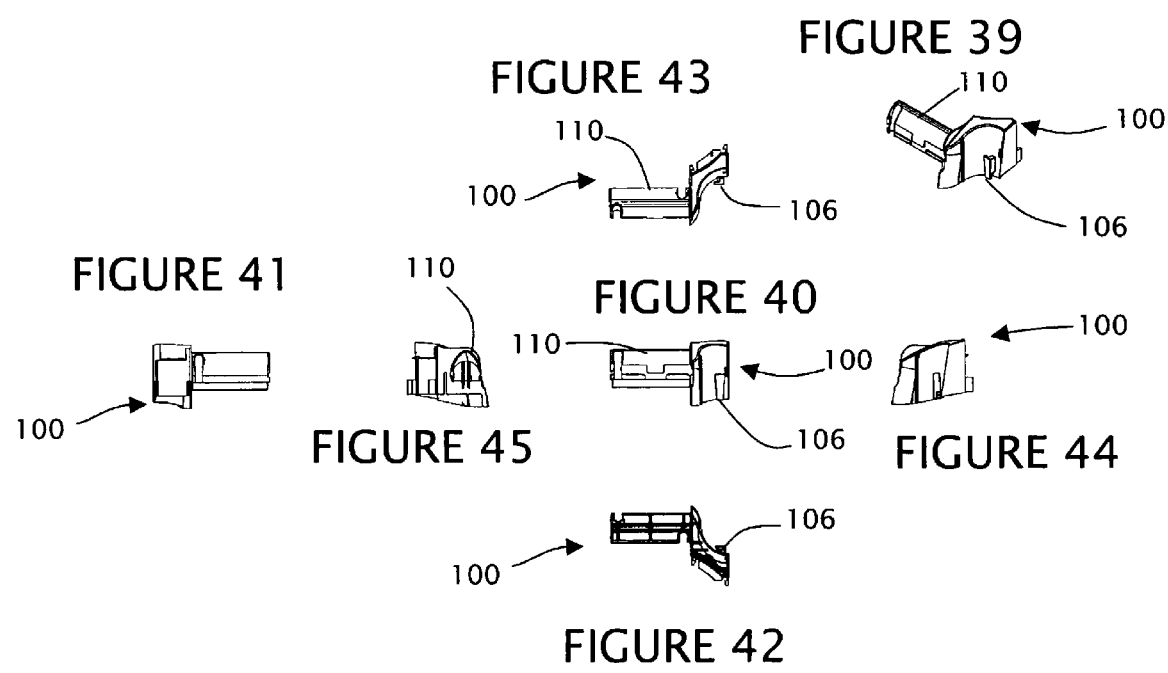

FIGURE 46
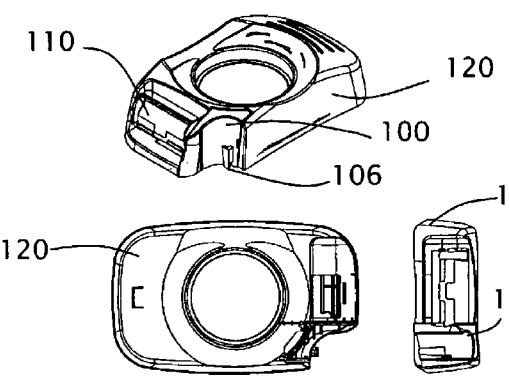
FIGURE 50
FIGURE 52
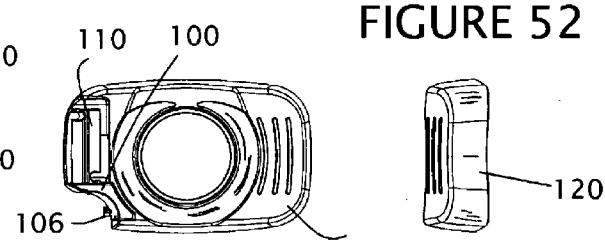
FIGURE 48    FIGURE 51    FIGURE 47
FIGURE 49

FIGURE 58
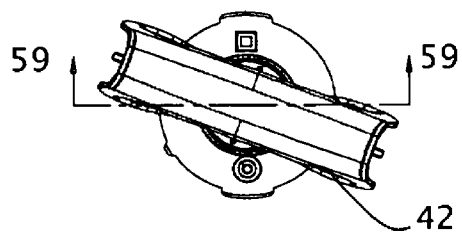
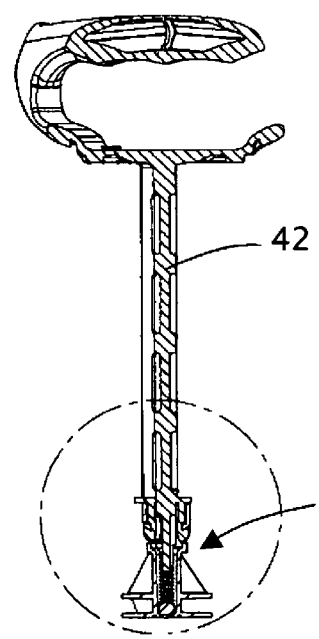
FIGURE 59
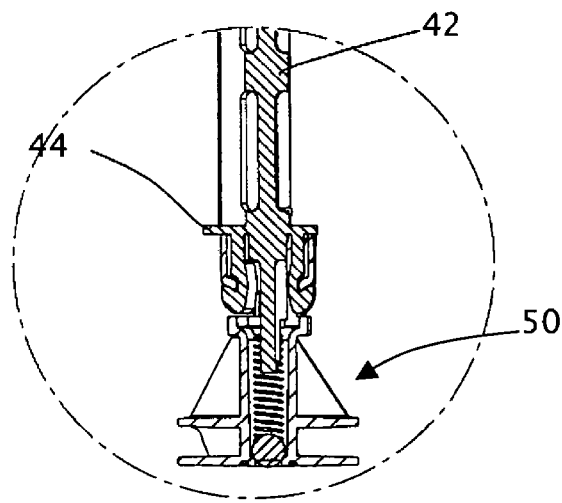
FIGURE 60

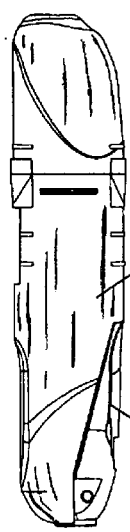
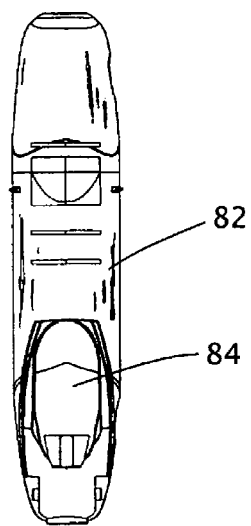
FIGURE 67  FIGURE 68  FIGURE 66
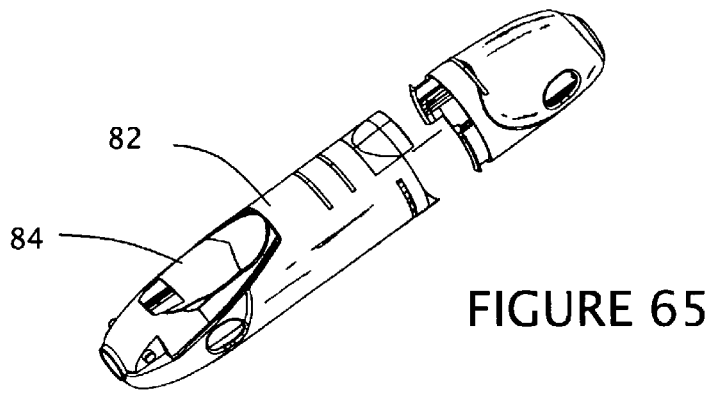
FIGURE 65

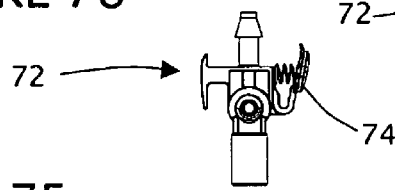
FIGURE 78
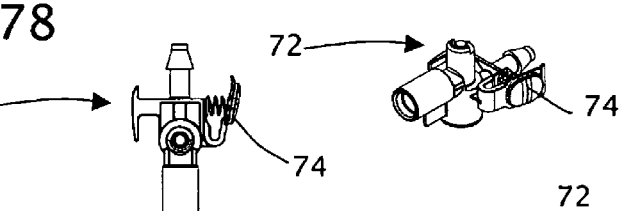
FIGURE 72
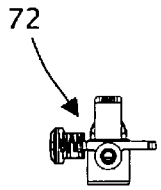
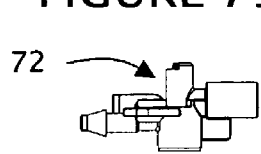
FIGURE 74
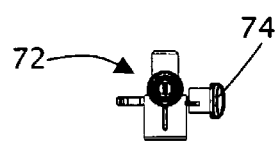
FIGURE 73
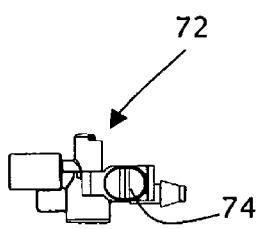
FIGURE 76
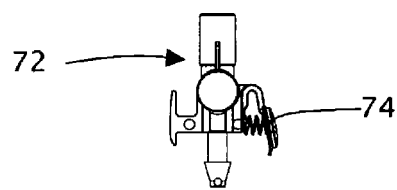
FIGURE 77

FIGURE 79
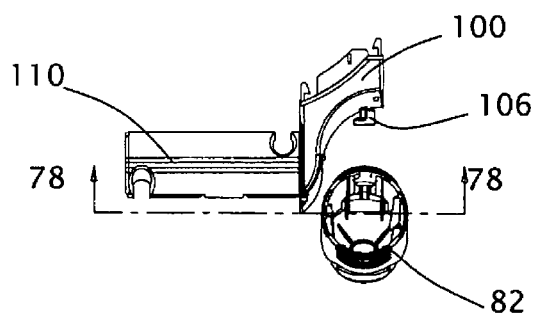
FIGURE 80
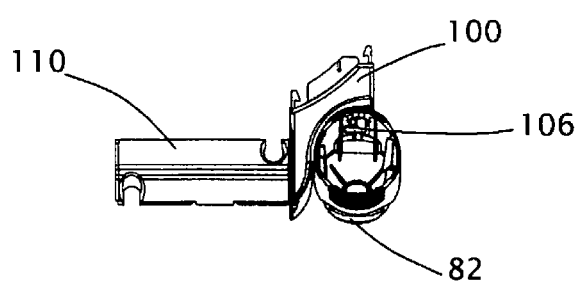
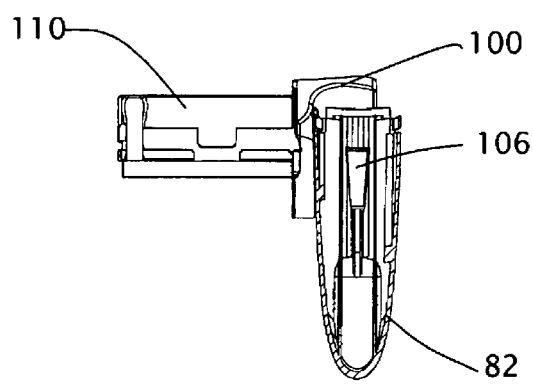
FIGURE 81

FLUID DISPENSING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to systems for selectively dispensing liquid from a container, and more particularly, to a system having a pump assembly selectively pressuring the liquid to be dispensed and a retractable-extendible wand-shut off assembly, wherein differences in manufacturing tolerances of the components do not limit functionality of the system.

2. Description of Related Art

Dispensing systems for the spray application of pesticides, insecticides, plant and grass nutrients, for lawn and garden applications have been available for many years.

These systems can include telescoping conduits to allow the operator to be spaced from discharge of the liquid. However, such telescoping conduits require an extensive series of seals and sealing surfaces. The number of sealing surfaces in conjunction with manufacturing tolerances of components and the desired price point typically result in leakage. In addition, a change in length of the telescoping conduit changes the available volume and thus can result in increased liquid pressure acting on the components of the system, which can lead to failure or unintended discharge.

U.S. Pat. No. 5,553,750 discloses a system including a trigger sprayer having cylindrical handle connected to a container closure, and a flexible tubing stored within the container during periods of non-use wherein the tubing is drawn from the container during the spraying operation. In a further configuration in U.S. Pat. No. 5,553,750, the tubing is coiled and stored within a receptacle located within the container during periods of non-use.

However, storage and uncoiling of the tubing is cumbersome and awkward, as the coil may stick or snag as the coils pulled out of the container. In addition, the trigger sprayer and handle are at a fixed size that remain connected to the container during periods of non-use, such as shipping and storage. This requires additional storage space and shelf space, thereby creating inefficiencies.

U.S. Pat. No. 5,469,993 provides a trigger sprayer with a handle that is stored within a recess provided in a sidewall of the container, wherein the recess is sized and shaped for releasably engaging the sprayer handle. The tubing connecting the container to the trigger sprayer is coiled and stored within a hollow trigger sprayer handle. In use, the handle is removed from the container recess, and the connector plugged into a spout on the container.

However, the container and trigger handle must be specially molded to provide the removable mounting. The available molding process for obtaining the required tolerances is costly and uneconomical. In addition, as the operator employs the trigger sprayer, the material is discharged proximal to the hand of the operator.

Further, such trigger operated sprayers require the pump mechanism be disposed within the handheld trigger, thereby substantially limiting the capacity of the pump mechanism. Therefore, a significant number of trigger cycles are required to dispense a given volume of liquid. This relatively high number of trigger cycles can lead to operator fatigue, or if in a professional setting, carpal tunnel syndrome.

Thus, the need exists for a fluid dispensing system which can reduce exposure of the operator to the material being applied, while providing a flexible conduit between a grip and a container. The need also exists for a dispensing system that can be readily reconfigured between a storage (or shelf) configuration and an operable configuration, without further pressurizing the system. The need further exists for a dispensing system that can incorporate components of different manufacturing tolerances (associated with different manufacturing processes), without sacrificing performance, or increasing costs.

BRIEF SUMMARY OF THE INVENTION

The present fluid dispensing system provides for the pressurization and selective discharge of a liquid, wherein operator exposure to the liquid is reduced. In one configuration, a dispensing valve is moveable relative to a trigger mechanism between a storage position and an operating position, wherein the valve in the storage position is non-reacting to the trigger mechanism. That is, the trigger mechanism is functional only when the system is disposed in a predetermined configuration.

The present fluid dispensing system can also provide for operational interconnection of components having different manufacturing tolerances. In a further configuration, portions of a fluid path are at least shielded by an adjacent structure.

In one configuration, a check valve is provided for controlling fluid flow from the container, independent of an operative state of the downstream dispensing valve. The present fluid dispensing system further contemplates for a selected breakaway of a wand assembly in response to an impact loading along the discharge conduit.

In one configuration, the fluid dispensing system includes a container; a pump assembly connected to the container selectively pressurizing the container, the pump assembly including an outlet port, the outlet port having a check valve precluding flow from the container through the outlet port and a discharge conduit having a single use connector engaging the outlet port and displacing the check valve to a flow position, the single use connector failing in response to a predetermined load and precluding operable re-engagement with the outlet in a failed state.

In a further construction, the fluid dispensing system for selectively discharging fluid from a container includes a discharge conduit fluidly connected to the container, the discharge conduct including a valve, a wand assembly having a grip body and a trigger, the wand assembly slideably connected to the discharge conduit between a spray position operably aligning the trigger and the valve, and a storage position precluding operable alignment trigger and the valve, and a coupler module releasably retaining the wand assembly in the storage position relative to the container, the coupler module precluding movement of the wand assembly to the spray position.

The fluid dispensing system for selectively dispensing fluid from a container can include a discharge conduit fluidly connected to the container, the discharge conduit having a constant length flow path and terminating at a discharge port and a grip body slideably connected to the conduit between a storage position locating the discharge port proximal to the grip body and an application position locating the discharge port distal to the grip body.

In a further configuration, a method is provided for dispensing fluid from a pressurized container, by sliding a grip body relative to a length of a discharge conduit to align a trigger mechanism connected to the grip body with a value in the discharge conduit, and actuating the trigger mechanism to dispose the valve in a flow position.

The fluid dispensing system can include a grip body, a trigger moveably connected to the grip body between a retracted position and an actuating position, a length of discharge conduit slideably connected to the grip body between a storage position and a spray position, and a valve connected to the discharge conduit and selectively precluding flow through the discharge conduit, the valve moveable with the discharge conduit between the storage position inoperably aligned with the trigger and the spray position operably aligned with the trigger.

Alternatively, the fluid dispensing system can include a trigger, a discharge conduit, and a valve connected to the discharge conduit to preclude/permit flow through the discharge conduit, the discharge conduit and the valve slideably moveable relative to the trigger between an operable position aligning the trigger and the valve, and a storage position precluding actuation of valve by the trigger.

In a further configuration, the fluid dispensing system includes a container, a wand assembly having a grip body, a coupler module, one time engagement means defined by the container and the coupler module for permitting engagement of the coupler module with the container and substantively precluding non-destructive separation of the coupler module from the container, and releasable engagement means defined by the coupler module and the grip body for releasably engaging the grip body with the coupler module.

A further method is provided of assembling a fluid dispensing system for delivery to a point of sale by engaging a coupler module with a container precluding non-destructive separation of the coupler module from the container, filling the container with a liquid prior to delivery at the point of sale, and fluidly connecting a single use connection between a wand assembly and the container after delivery to a point of sale.

A fluid dispensing system is also contemplated having a blow molded container, a pump assembly partially disposed in the container and including an outlet port, the outlet port fluidly connected to a check valve, a discharge conduit having a rigid section and a flexible section, the flexible section connected to the outlet port and displacing the check valve, a dispensing valve in the discharge conduit, and a grip body slideably connected to the discharge conduit to operably align a trigger with the dispensing valve.

In a further configuration, the fluid dispensing system includes a container; a skirt connected to the container, a discharge conduit, a grip body connected to the discharge conduit, and a coupler module connected to the skirt, the coupler module including a mating surface for releasably retaining the grip body.

The fluid dispensing system also contemplates a container, a discharge conduit fluidly connected to the container, a grip body connected to the discharge conduit, and a coupler module connected to the container to preclude non-destructive separation.

The fluid dispensing system also provides for a container and a skirt connected to the container to preclude non-destructive separation, the skirt having a narrower manufacturing tolerance than the container.

BRIEF DESCRIPTION OF THE SEVERAL VIEWS OF THE DRAWING(S)

FIG. 12 is a perspective view of the dispensing valve.

FIG. 13 is a bottom plan view of the dispensing valve of FIG. 12.

FIG. 14 is a side elevational view of the dispensing valve of FIG. 12.

Figure 20:
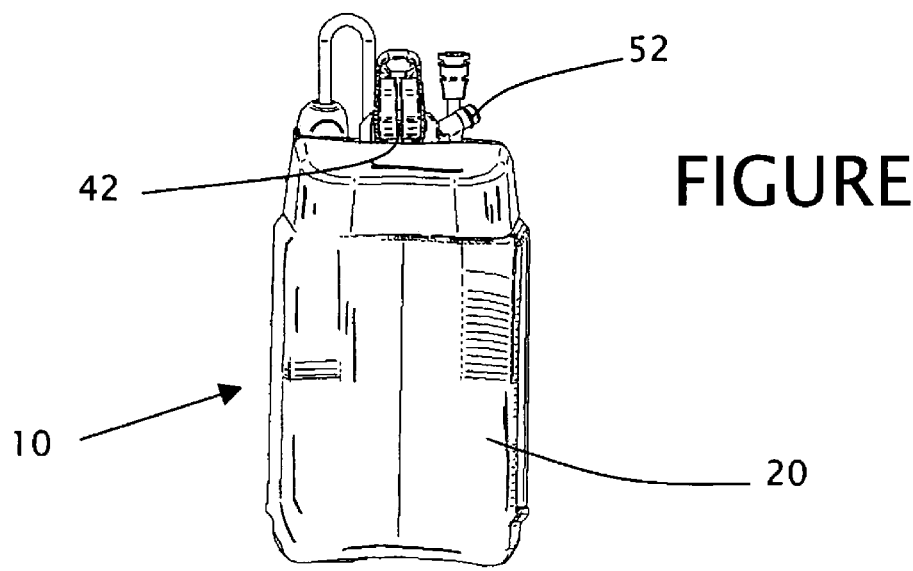

FIG. 20 a left side elevational view of a configuration of the fluid dispensing system.

Figure 21:
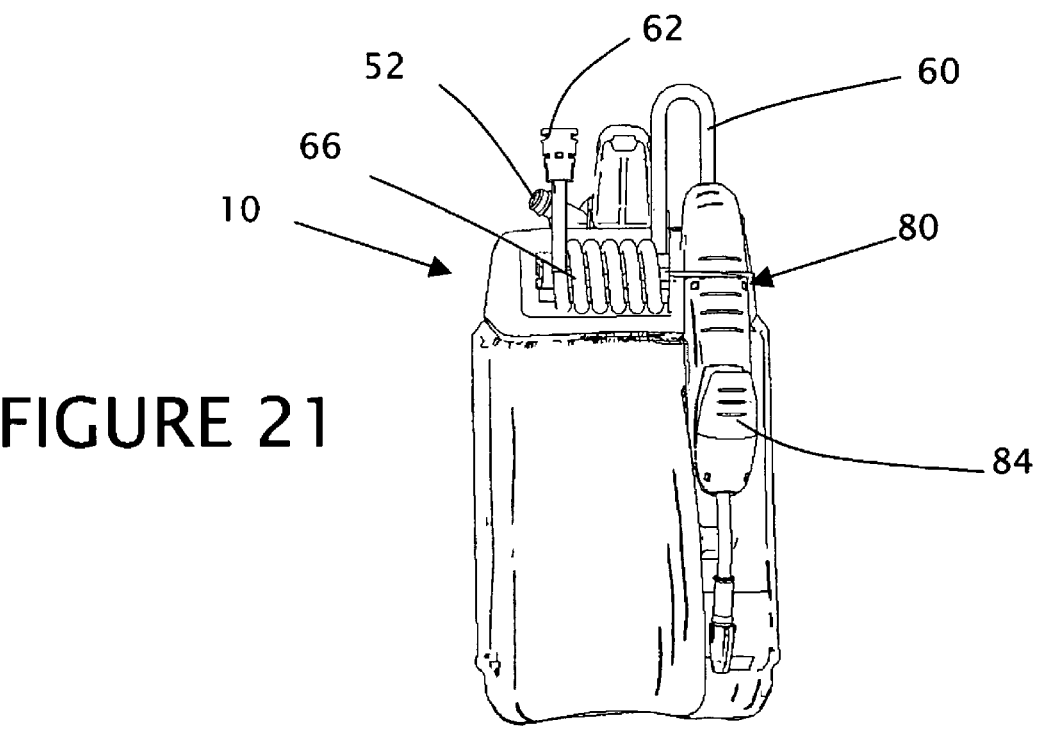

FIG. 21 is a right side elevational view of the fluid dispensing system of FIG. 20.

Figure 22:
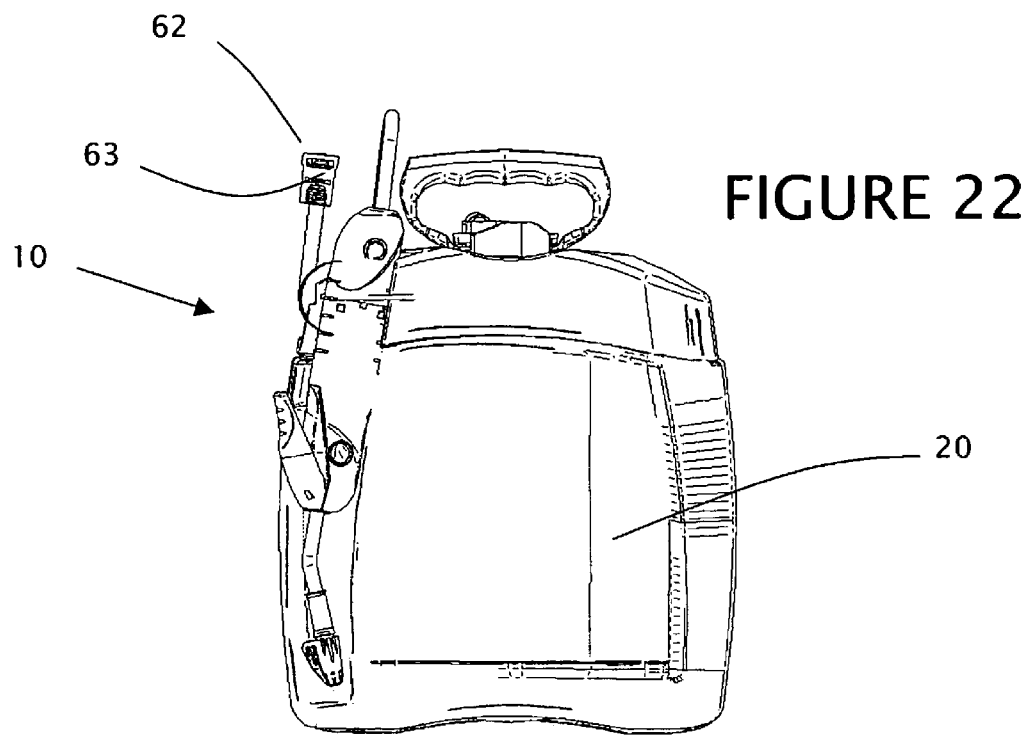

FIG. 22 is a front elevational view of the fluid dispensing system of FIG. 20.

Figure 23:
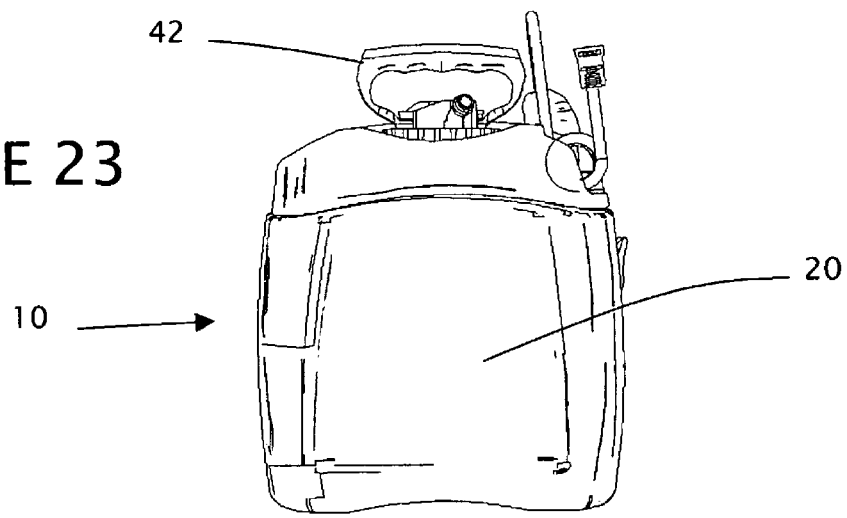

FIG. 23 is a rear elevational view of the fluid dispensing system of FIG. 20.

Figure 24:
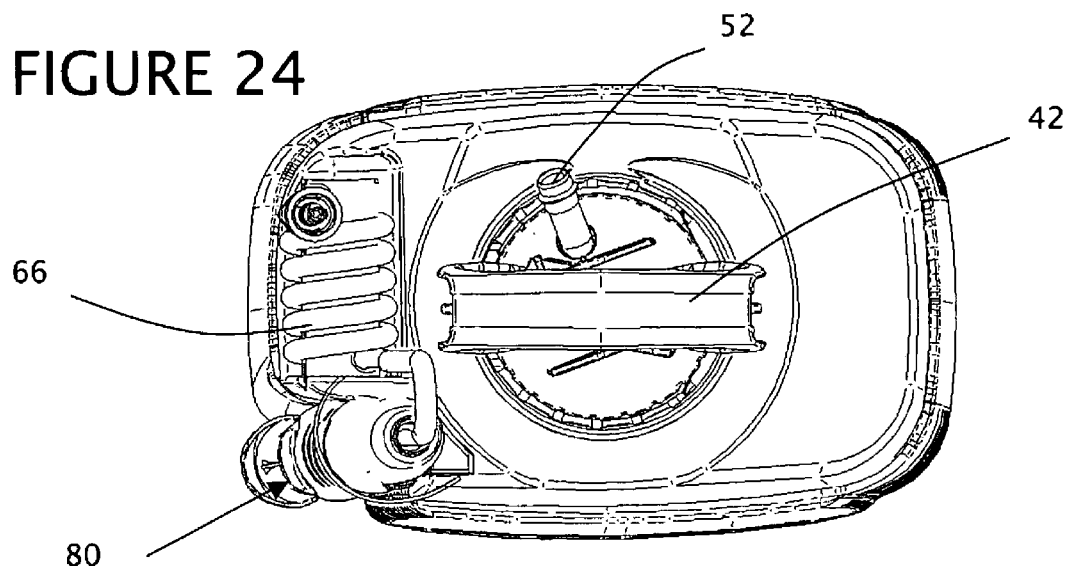

FIG. 24 is a top plan view of the fluid dispensing system of FIG. 20.

Figure 25:
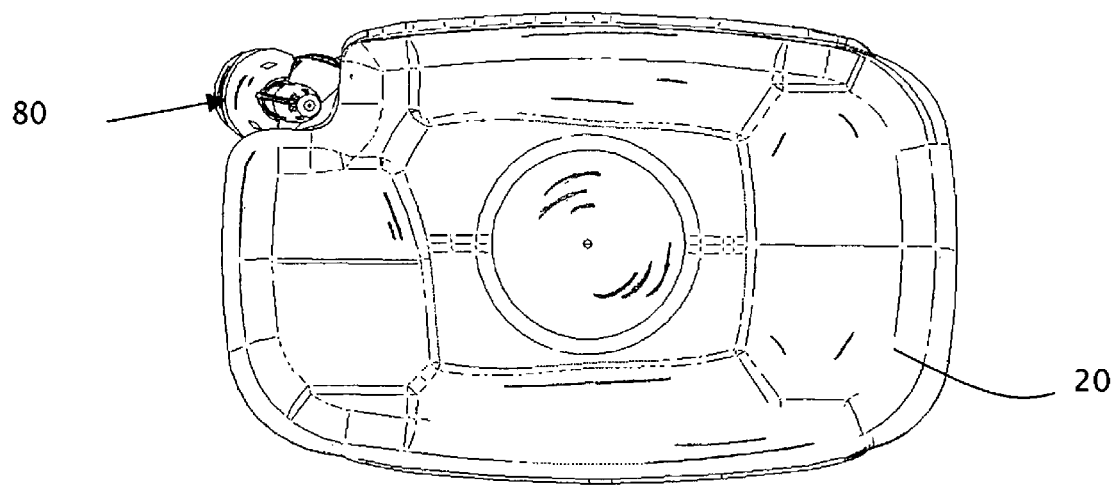

FIG. 25 is a bottom plan view of the fluid dispensing system of FIG. 20.

Figure 26:
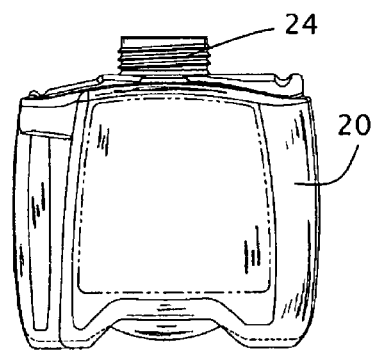

FIG. 26 is a front side elevational view of an alternative container.

Figure 27:
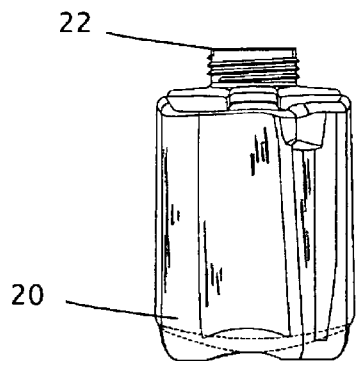

FIG. 27 is a left elevational view of the alternative container of FIG. 26.

Figure 28:
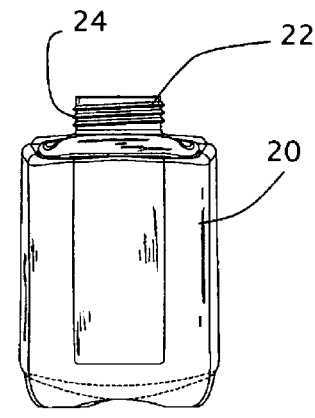

FIG. 28 is a right elevational view of the alternative container of FIG. 26.

Figure 29:
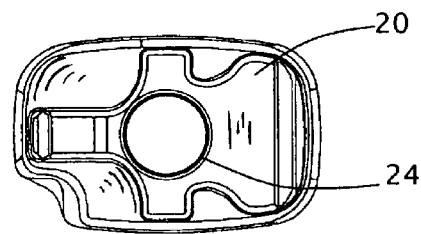

FIG. 29 is a top plan view of the alternative container of FIG. 26.

Figure 30:
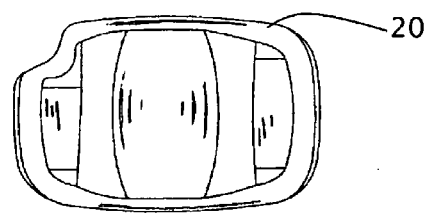

FIG. 30 is a bottom plan view of the alternative container of FIG. 26.

Figure 30A:
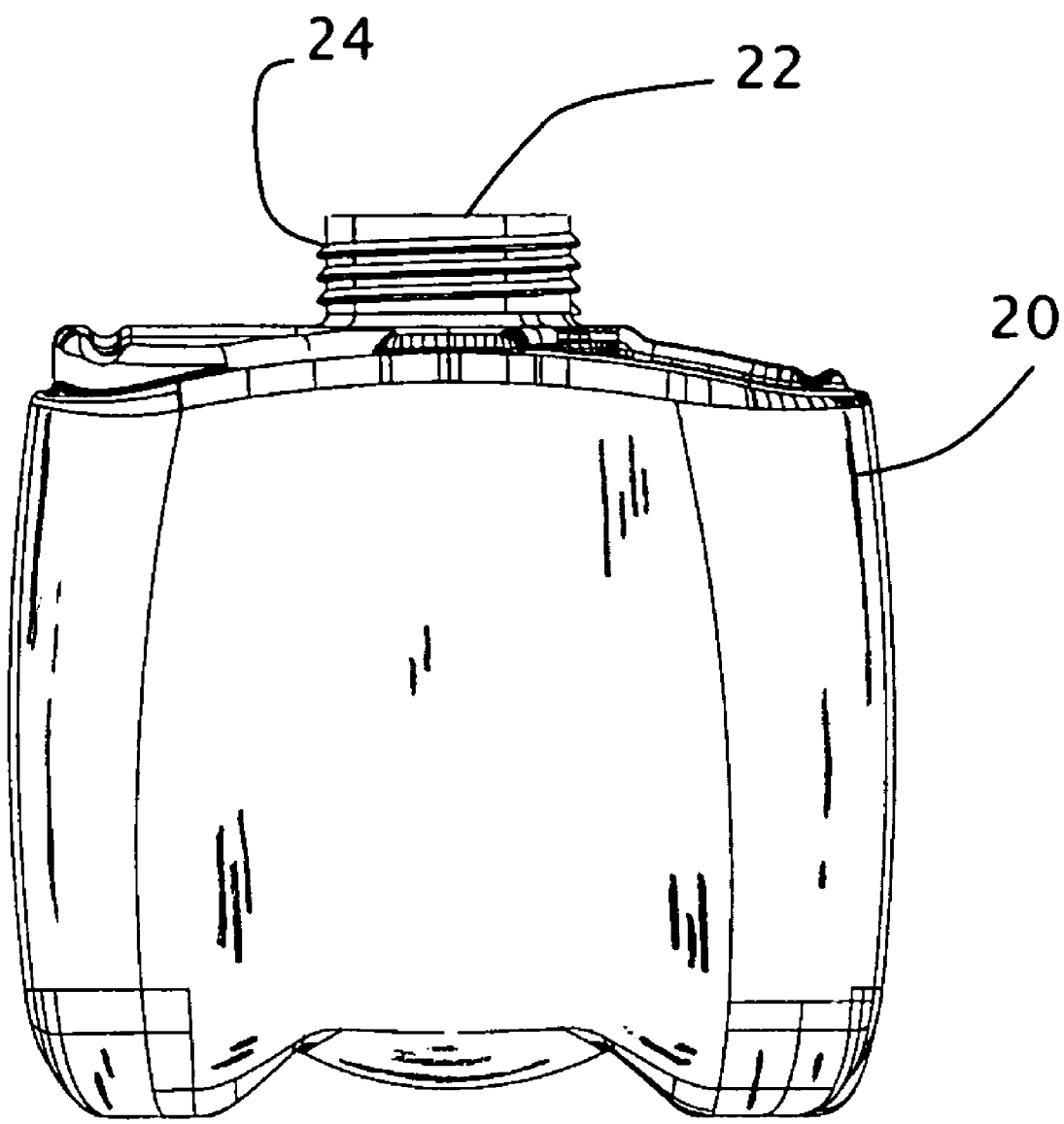

FIG. 30A is a rear elevational view of the alternative container of FIG. 26.

Figure 31:
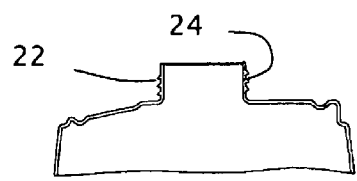

FIG. 31 is a cross sectional view of an upper portion of the alternative container of FIG. 26.

FIG. 32 is a perspective view of an alternative non-precision skirt.

FIG. 33 is a top plan view of the alternative non-precision skirt of FIG. 32.

FIG. 34 is a bottom plan view of the alternative non-precision skirt of FIG. 32.

FIG. 35 is a left side elevational view of the alternative non-precision skirt of FIG. 32.

FIG. 36 is a right side elevational view of the alternative non-precision skirt of FIG. 32.

FIG. 37 is a front elevational view of the alternative non-precision skirt of FIG. 32.

FIG. 38 is a rear elevational view of the alternative non-precision skirt of FIG. 32.

FIG. 39 is a perspective view of an alternative coupler module.

FIG. 40 a front elevational view of the coupler module of FIG. 39.

FIG. 41 a rear elevational view of the coupler module of FIG. 39.

FIG. 42 a bottom plan view of the coupler module of FIG. 39.

FIG. 43 a top plan view of the coupler module of FIG. 39.

FIG. 44 a left side elevational view of the coupler module of FIG. 39.

FIG. 45 a right side elevational view of the coupler module of FIG. 39.

FIG. 46 is a perspective view of the non-precision skirt of FIG. 32 operably engaged with the coupler module of FIG. 39.

FIG. 47 is a top plan view of the assembly of FIG. 46.

FIG. 48 is a bottom plan view of the assembly of FIG. 46.

FIG. 49 is a left side elevational view of the assembly of FIG. 46.

FIG. 50 is a right side elevational view of the assembly of FIG. 46.

FIG. 51 is a front elevational view of the assembly of FIG. 46.

FIG. 52 is a rear elevational view of the assembly of FIG. 46.

Figure 53:
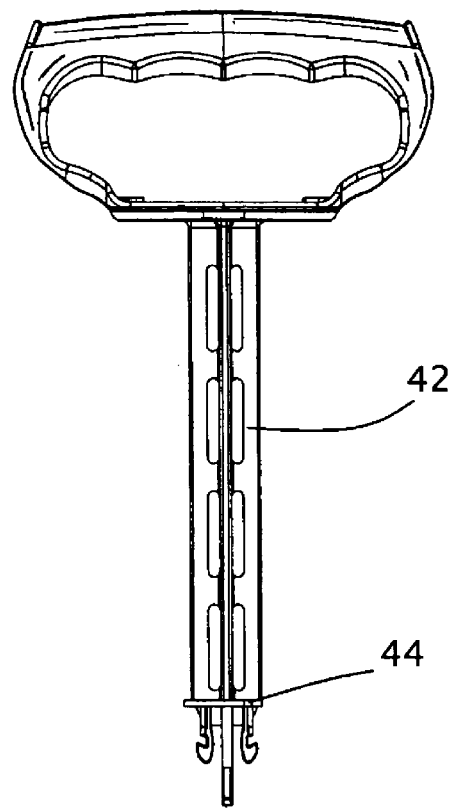

FIG. 53 is a side elevational view of an alternative configuration of the pump handle.

Figure 54:
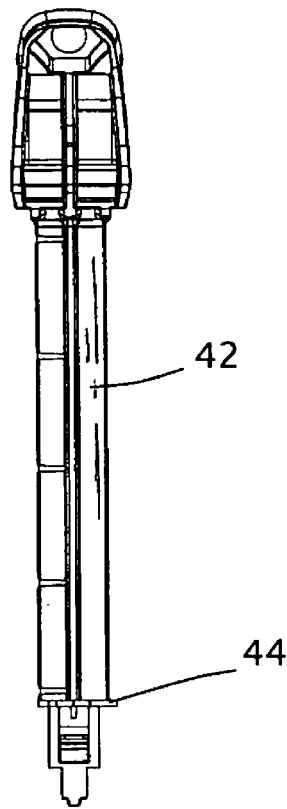

FIG. 54 is an end elevational view of the pump handle of FIG. 53.

Figure 55:
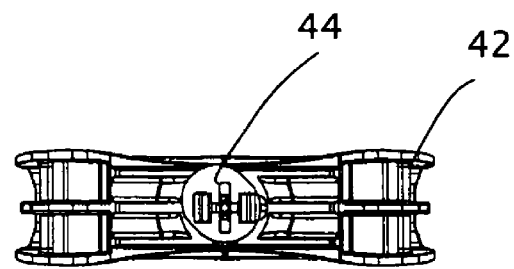

FIG. 55 is a bottom plan view of the pump handle of FIG. 53.

Figure 56:
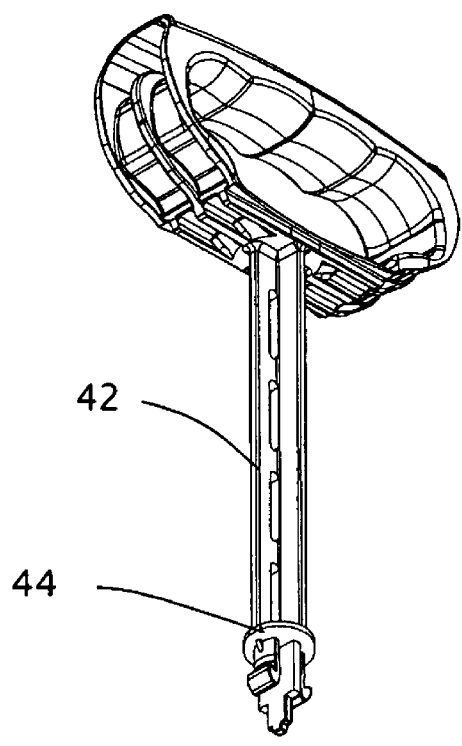

FIG. 56 is an upward perspective view of the pump handle of FIG. 53.

Figure 57:
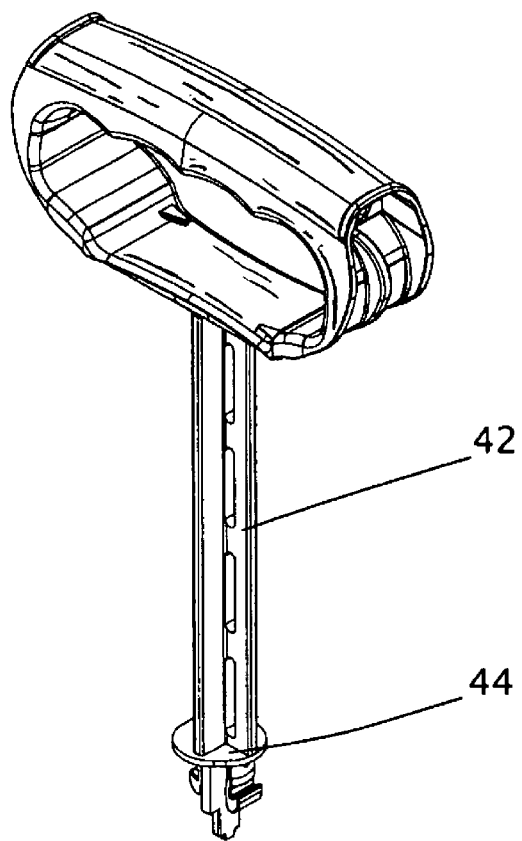

FIG. 57 is a downward perspective view of the pump handle of FIG. 53.

FIG. 58 is a top plan view of the pump handle and attached pressurizing valve sub assembly.

FIG. 59 is a cross sectional view taken along lines 59-59 of FIG. 58.

FIG. 60 is an enlarged portion of FIG. 58 showing the pressurizing valve sub assembly.

Figure 61:
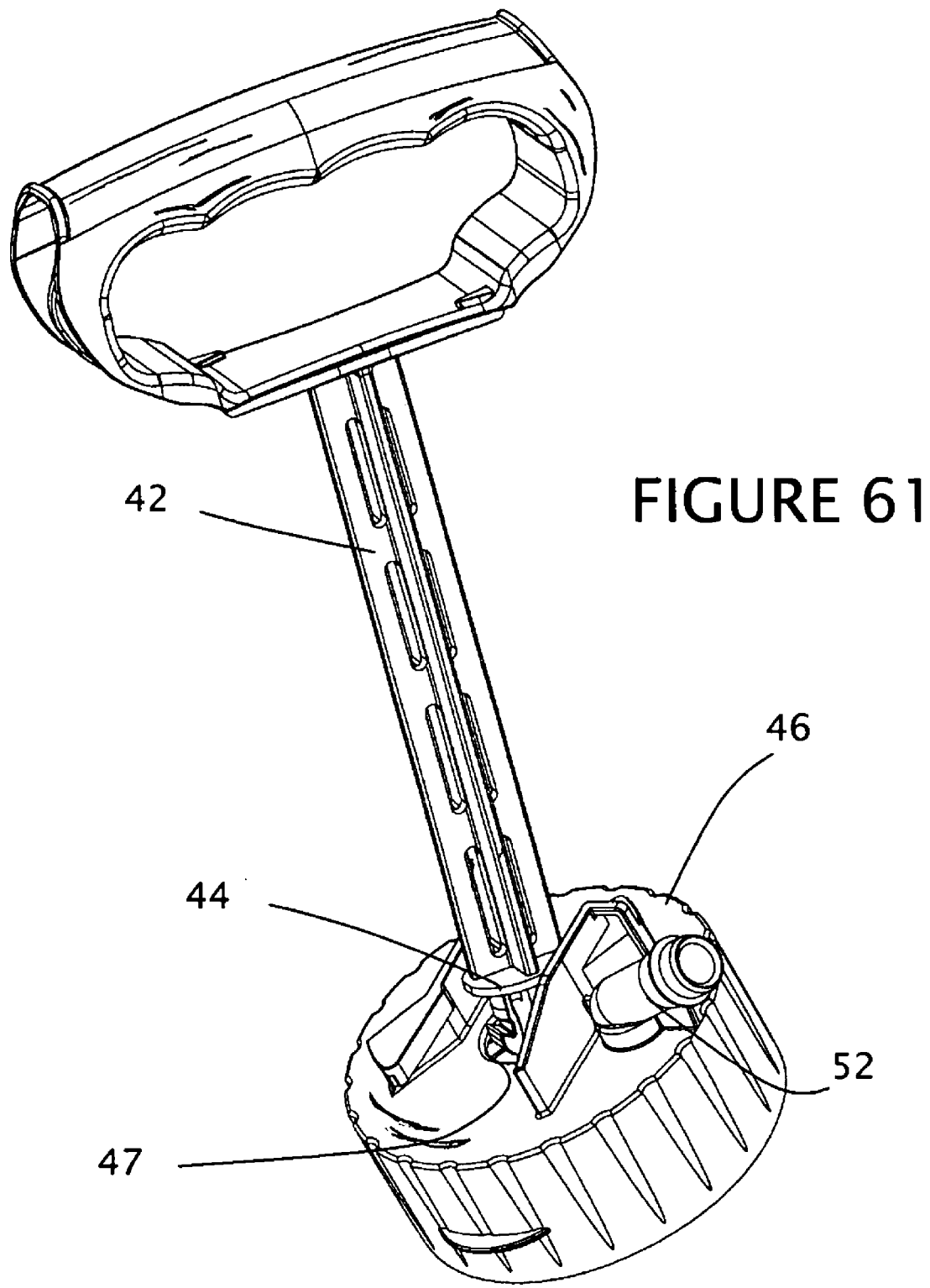

FIG. 61 is a perspective view of the pump handle being inserted into a container engaging cap.

Figure 62:
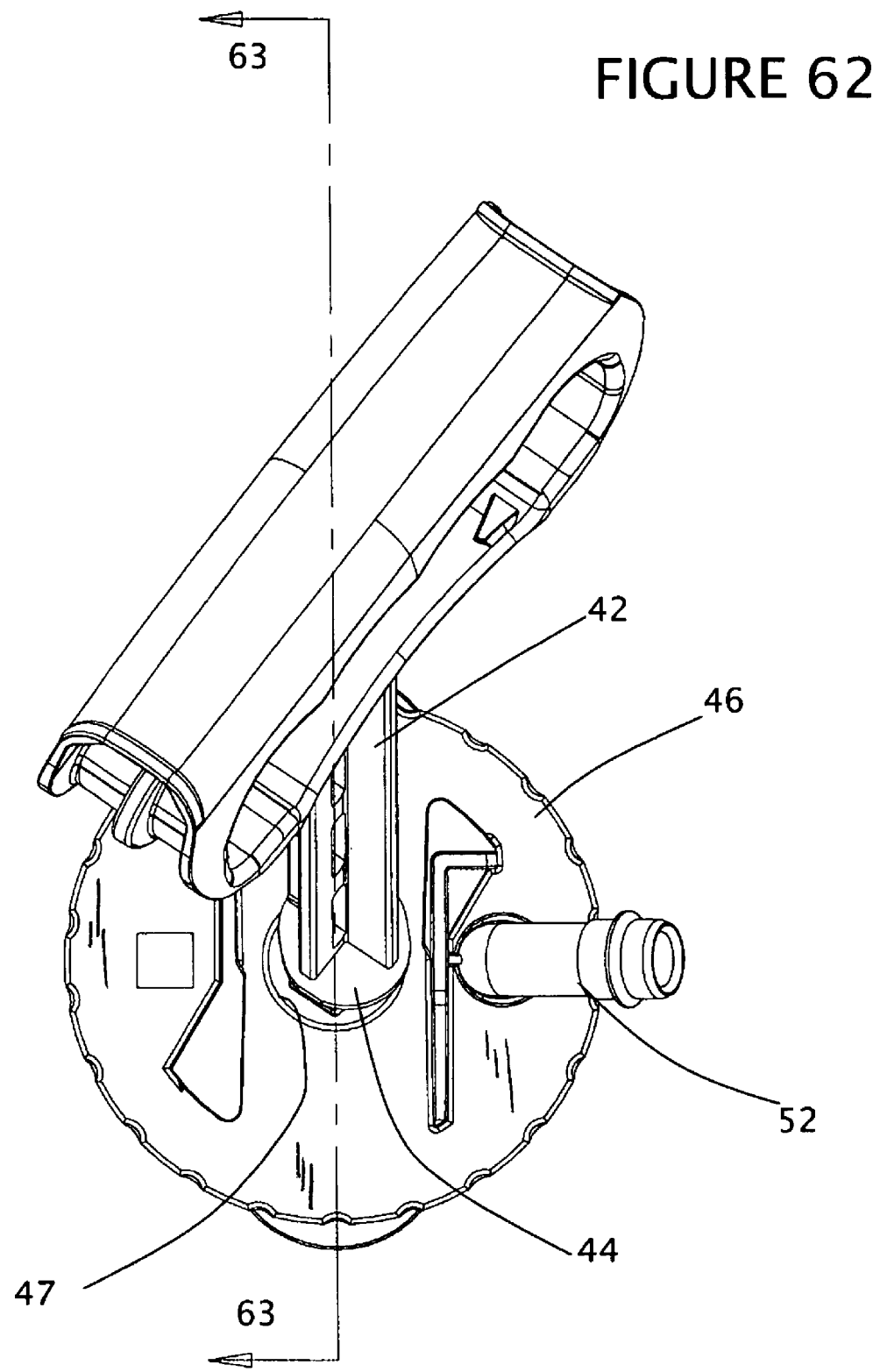

FIG. 62 is a top plan view of the pump handle and container engaging cap of FIG. 61.

Figure 63:
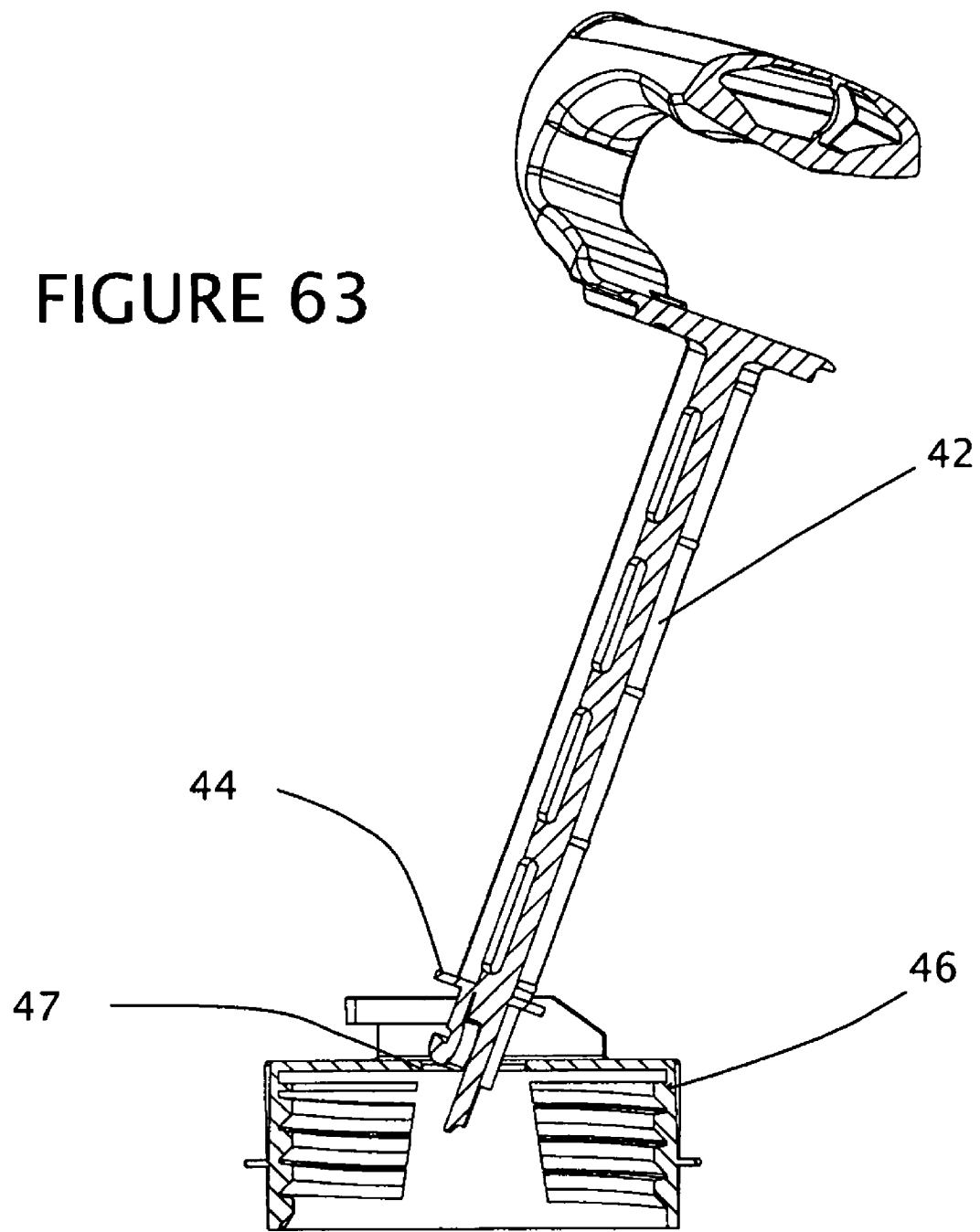

FIG. 63 is a cross sectional view taken along lines 63-63 of FIG. 62.

Figure 64:
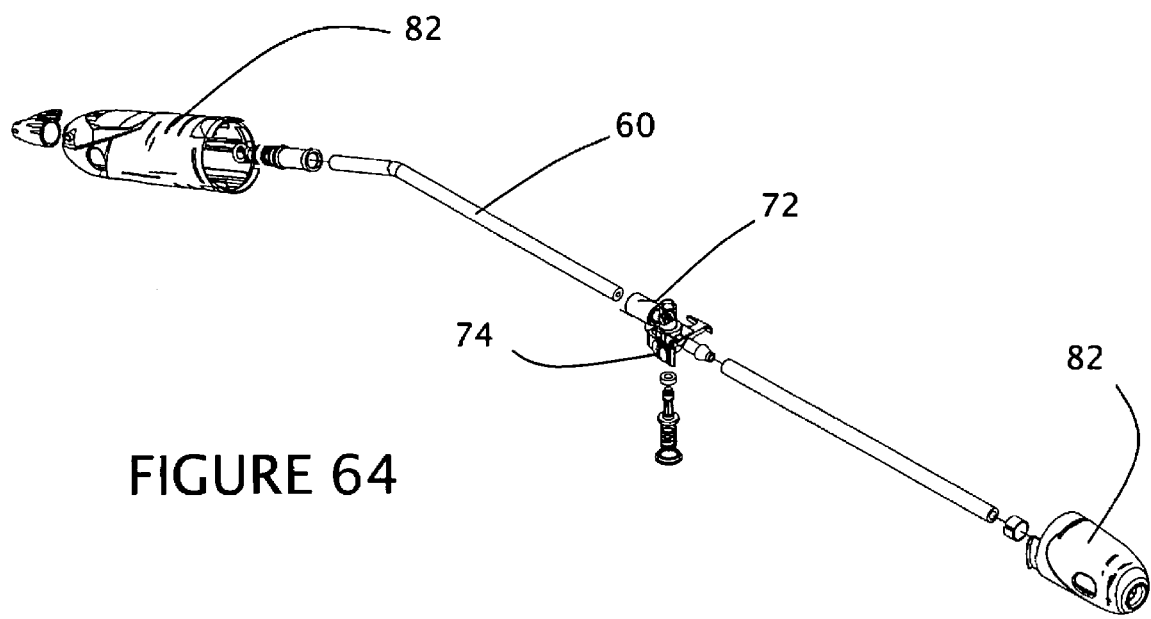

FIG. 64 is an exploded perspective view of an alternative construction of the wand assembly.

FIG. 65 is an exploded perspective view of the grip body of FIG. 64.

FIG. 66 is a left side elevational view of the grip body of FIG. 64 in an assembled state.

FIG. 67 is a right side elevational view of the grip body of FIG. 66.

FIG. 68 is a top plan view of the grip body of FIG. 66.

Figure 69:
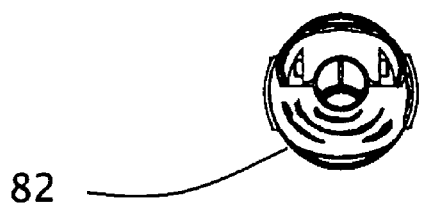

FIG. 69 is a front elevational view of the grip body of FIG. 66.

Figure 70:
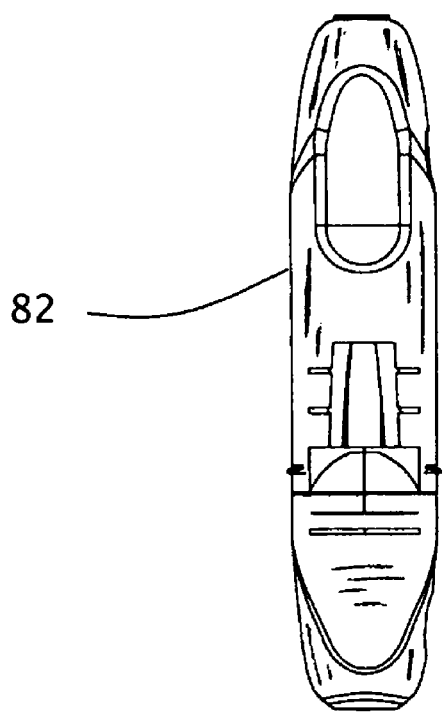

FIG. 70 is a bottom plan view of the grip body of FIG. 66.

Figure 71:
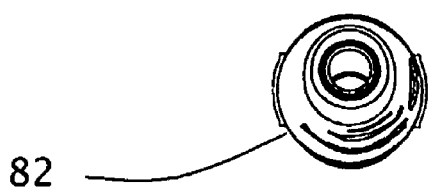

FIG. 71 is a rear elevational view of the grip body of FIG. 66.

FIG. 72 is a perspective view of an alternative configuration of the dispensing valve.

FIG. 73 is a rear elevational view of the dispensing valve of FIG. 69.

FIG. 74 is a front elevational view of the dispensing valve of FIG. 69.

FIG. 75 is a left side elevational view of the dispensing valve of FIG. 69.

FIG. 76 is a right side elevational view of the dispensing valve of FIG. 69.

FIG. 77 is a top plan view of the dispensing valve of FIG. 69.

FIG. 78 is a bottom plan view of the dispensing valve of FIG. 69.

FIG. 79 is a top plan view of the grip body and the coupler module prior to operable engagement.

FIG. 80 is a top plan view showing operable engagement of the grip body and the coupler module.

FIG. 81 is cross sectional view taken along lines 78-78 of FIG. 76.

Figure 82:
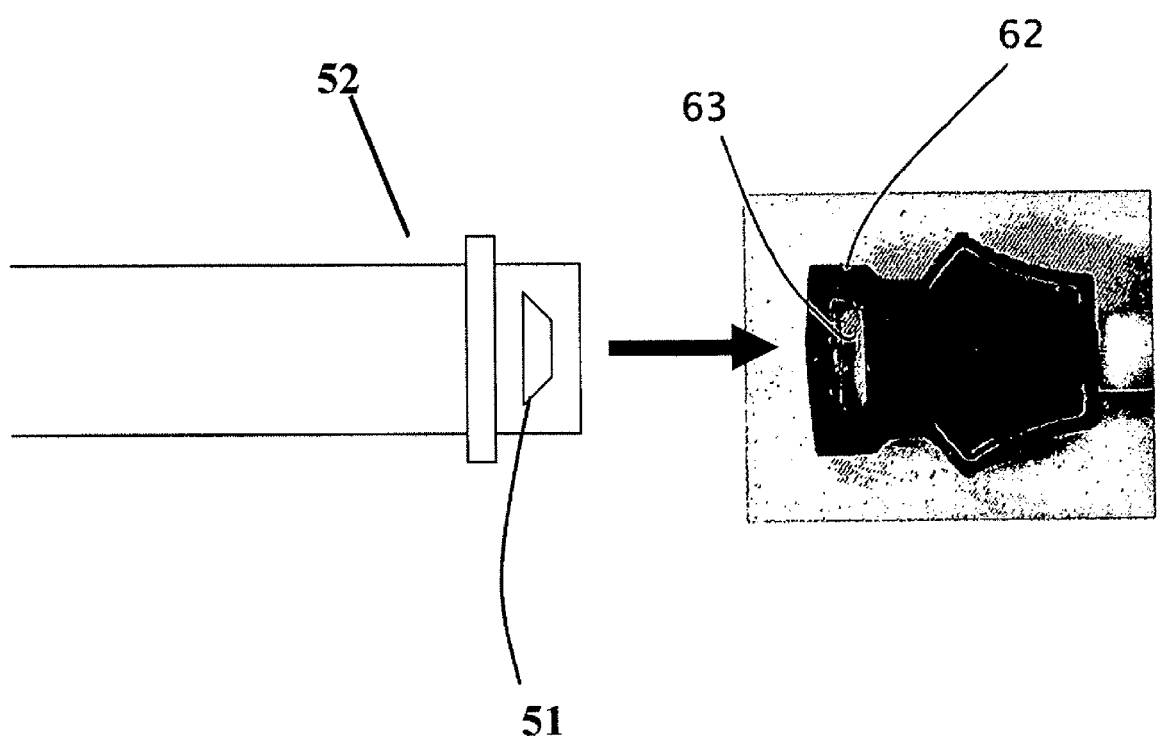

FIG. 82 is a cross sectional view of the outlet port and the portion of the discharge conduit for engaging the pump assembly.

DETAILED DESCRIPTION OF THE INVENTION

Figure 1:
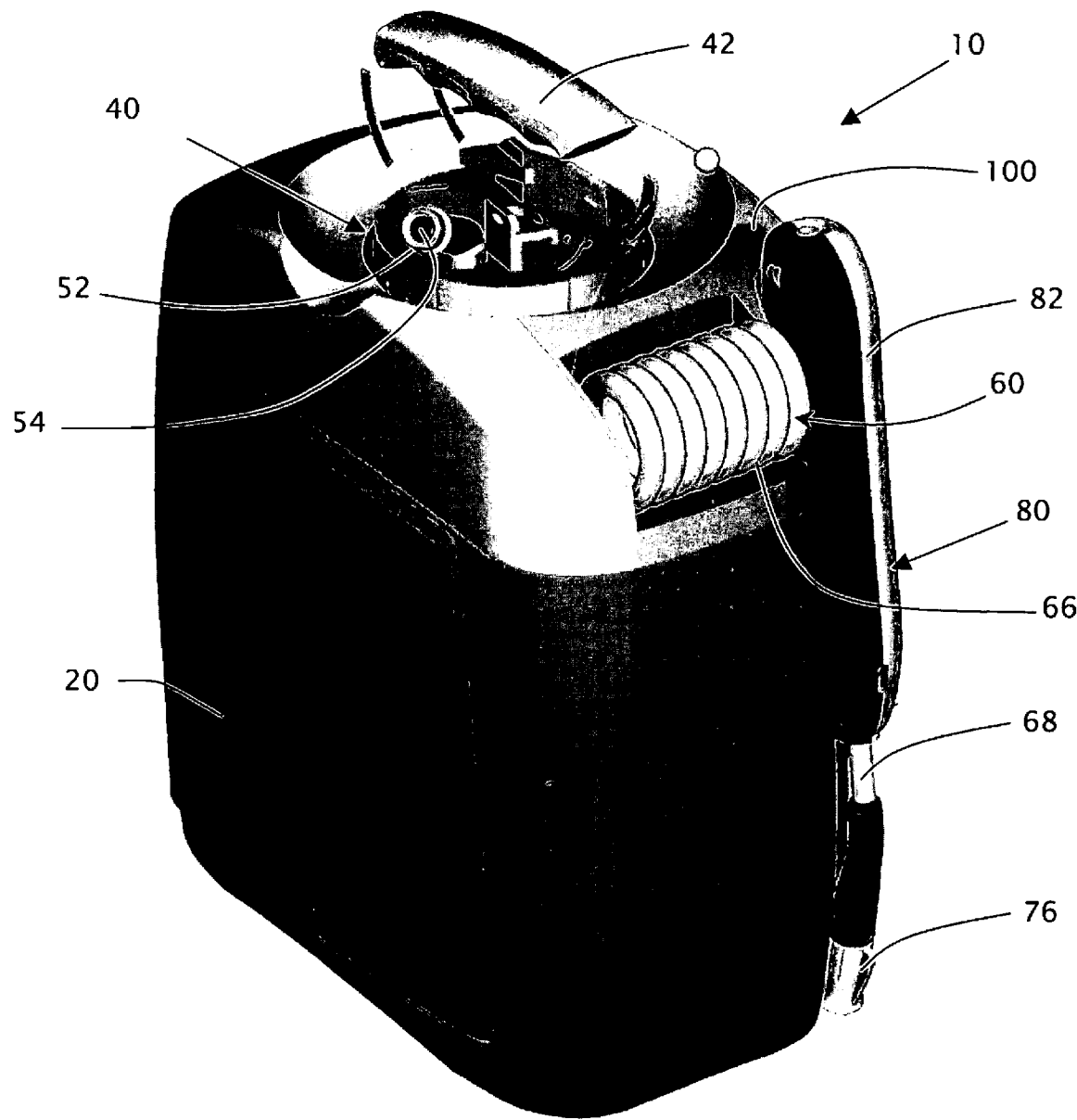
FIG. 1 is a left perspective view of the fluid dispensing system.
Figure 2:
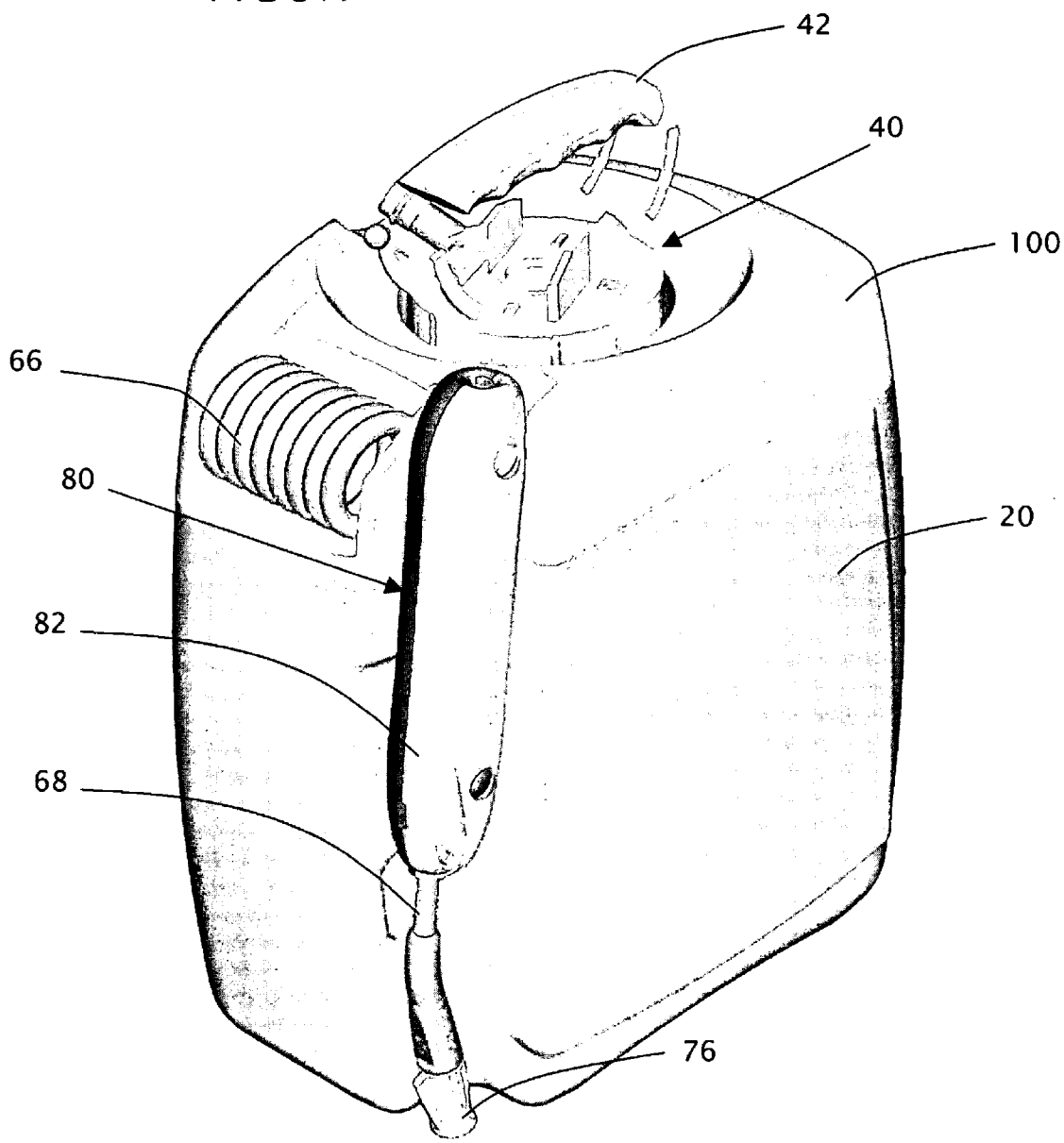
FIG. 2 is a right perspective view of the fluid dispensing system of FIG. 1.
Figure 3:
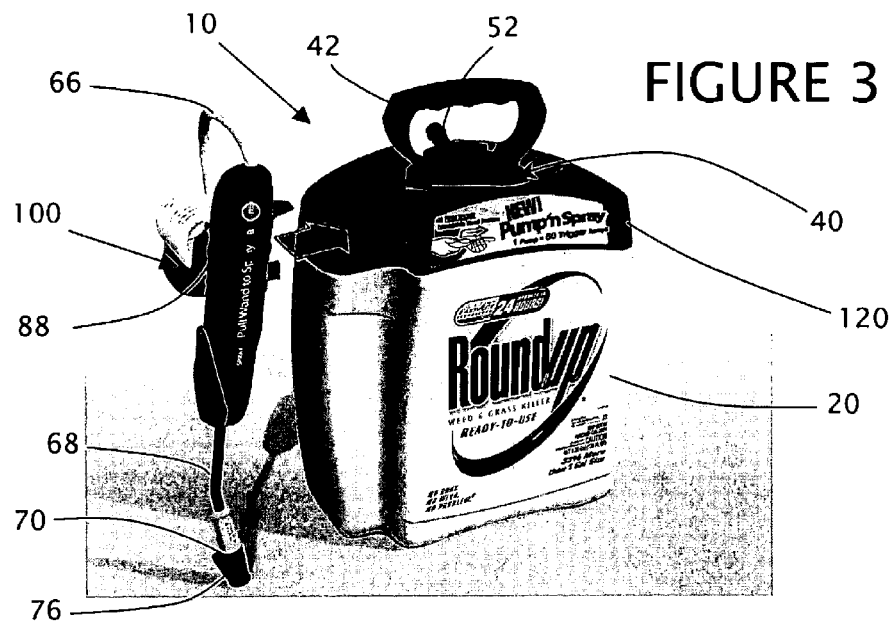
FIG. 3 is a perspective view of an alternative configuration of the fluid dispensing system.

As seen in FIG. 1, the fluid dispensing system 10 includes a container 20, a pump assembly 40, a discharge conduit 60, a wand assembly 80 and a coupler module 100.

In one configuration, the container 20 is a blow molded pressure vessel for withstanding an increased pressure within the vessel. As a blow molded component, the container 20 is relatively inexpensive compared to an injection molded container of a comparable size. It is recognized, there is a trade-off between a blow molded component and an injection molded component, in that wider tolerances exist in the resulting product from the blow molding process. However, the blow molding process is typically more economical than injection molding. It is understood the container 20 can be formed by any of a variety of processes, without departing from the present system.

In selected configurations (FIGS. 6-8 and 26-30A), the container 20 includes a neck 22 and a single opening 21 located in the neck. External threads 24 are formed about the neck 22. A shoulder 26 is formed on an outside surface of the container 20, such as on the neck 22 intermediate the threads 24 and the remainder of the container.

The container 20 can have any of a variety of profiles, such as cylindrical, generally spherical, as well as generally rectangular. The container 20 is formed of the material which is at least substantially inert with respect to the liquid to be retained in and dispensed from the container. For a blow molded container 20, thermoplastics and thermoplastic elastomers have been found satisfactory, such as polyethylene and polypropylene including high density polyethylene (HDPE). However, it is understood that thermoset or curable materials can be employed for forming the container 20. A satisfactory size of the container 20 has been found to be capable of retaining approximately 1.33 gallons of liquid. Such liquid volume generally corresponds to approximately 10.6 pounds of liquid. It is understood the particular size of the container is not limiting to the present fluid dispensing system 10.

The pump assembly 40 is partially received within the container 20 and provides for the selective pressurization of the container. Although the pump assembly 40 can be a positive displacement pump, it has been found advantageous to employing a pressure pump to provide for a compression and discharge of the liquid from the container 20. A manually actuated pump assembly 40 has been found satisfactory.

Generally, the pump assembly 40 includes an elongate cylinder generally disposed through the opening of the container to be located within the container. A piston can be incorporated into (or connected to) a pump handle 42, wherein the pump handle is slideably disposed within the cylinder, typically through a container engaging cap 46. The pump handle 42 can include a grip configured for grasping by the operator. The piston and the cylinder include appropriate one-way valving to allow for pressurization of the ullage space of (and hence liquid in) the container. As seen in FIGS. 58 and 59, a pressurizing valve sub assembly 50 can be separately constructed and engaged with the pump handle 42. The pump assembly 40 also includes a safety valve for bleeding off pressure above a given level, or precluding pressurization of the ullage space above the given pressure. Representative pump assemblies are generally shown in U.S. Pat. Nos. 5,669,532; 5,624,061; 4,984,742 and 5,072,884, herein expressly incorporated by reference. In one configuration, one of the pump assembly 40 or the outlet port 52 can include a bleed valve to release pressure from the container 20 over a given period of time. Bleed valves are well known in the art such as by Performance Systematics Inc., and satisfactory bleed valves can be selected to reduce the pressure of the container 20 over a period of approximately one hour. Alternatively, bleed valves can be selected to bring the pressure of the container 20 to substantially ambient temperature within approximately 2 hours. The bleed valve reduces the long term loading of seal surfaces, as well as reduces the likelihood of unintentional discharge.

The pump handle 42 is rotatable relative to the cap 46 between a transport (storage) position adjacent the cap, and a pumping position allowing vertical actuation of the handle (and pressurizing valve sub assembly).

The pump assembly 40 also includes a dip tube for providing a flow path from a bottom or lower portion of the container 20 through an outlet port 52 in the pump assembly.

Referring to FIGS. 53-63, the pump handle 42 can include a key 44 that requires interconnection of the handle and the cap 46 at a predetermined orientation, such as an inclined angle. The key 44 can have any of a variety of configurations which require the handle 42 to assume an insertion angle (or orientation) that is unlikely to be encountered during intended operating parameters of the system 10. In one configuration, the key 44 defines an elliptical periphery transverse to a longitudinal dimension of the handle 42. It is understood the cap 46 includes an aperture 47 having a corresponding periphery requiring the aligned insertion of the key 44. Thus, the pump handle 42 cannot be withdrawn from the pump assembly 40 (and through the cap 46) along a vertical line of withdrawal. As the key 44 contacts the underside of the cap 46 during vertical translation, impact of the pressurizing valve sub assembly 50 on the bottom of the cap 46 is minimized. Specifically, if the container 20 were to unintentionally rotate relative to the pump handle 42 when carrying the container, and the container slides down the length of the handle, the load of the container is ultimately borne by the key 44 contacting the underside of the cap 46, rather than the pressurizing valve sub assembly 50 hitting the cap. Thus, the pressurizing valve sub assembly 50 is shielded from unintended impact against the cap 46.

As seen in FIGS. 58 and 59, the pressurizing valve assembly 50 can be engaged with the lower end of the pump handle 42. The pressurizing valve sub assembly 50 can be constructed to limit the pressurization of the container 20. That is, a valve (spring) bias within the pressurizing valve assembly 50 can be selected to preclude over pressurization of the container 20. A satisfactory operating pressure has been found to be approximately 15 pounds per square inch (psi) to 18 psi. A bypass pathway of the pressurizing valve sub assembly 50 an be selected such that upon reaching the intended operating pressure of the container 20, the pressure limiter (or valve) can vibrate or oscillate at a frequency substantially different than that during pressurization. Thus, an audible signal can be provided to the user when further pumping will not increase pressure in the container 20.

The cap 46 is internally threaded to cooperatively engage the threads 24 on the neck 22 of the container 20. The threads 24 are set by the molding process of the container and are constructed to start in the same location with respect to the remaining portion of the container 20. The internal threads of the cap 46 are also created to start in a generally single, consistent location. Thus, as the handle 42 engages the cap 46 in only a single orientation, and the threads of the cap and the container start in consistent positions, threaded engagement of the cap and the container results in the handle (including the open portion of the handle) engaging the container 20 in a consistent orientation. Upon assembly of the system 10, the orientation of the assembled cap 46, the pump handle 42 and the container 20 can be within a +/−15°. This alignment provides enhanced packaging and presentation of the system 10.

Although the outlet port 52 for the liquid to be dispensed from the container 20 is shown as incorporated into the pump assembly 40, as seen in FIGS. 1, 20, and 21, it is contemplated the outlet port can be formed in the container 20. However, to reduce costs, the outlet port 52 is formed as a component of and within the pump assembly 40.

The outlet port 52 includes a one-way valve, such as a check valve 54 (to be shown), biased to a closed position precluding flow through the outlet port. The check valve 54 can be biased to the closed position by any of a variety of mechanisms including metal or polymeric springs, flaps or fingers. Thus, as pressure is increased in the container 20, the pressure acting on the check valve 54 and resulting force urging the check valve to a closed (no flow) position is increased. In one configuration, the check valve 54 is proximal to the outlet point 52. However, it is understood the check valve 54 can be from the outlet port 52 to accommodate, for example, manufacturing considerations.

The discharge conduit 60 is connectable to the outlet port 52, wherein connection of the discharge conduit to the outlet port displaces the check valve 54 to permit flow through the outlet port. In one configuration, the discharge conduit 60 is connected to the outlet port 52 by a one time or single use connection, wherein the connection provides a generally predetermined resistance to separation. Upon a separation force greater than the predetermined resistance, the connection fails, thereby allowing the discharge conduit 60 to be separated from the outlet port 52 and hence the container 20, whereby the check valve 54 is disposed to the closed position precluding further fluid flow from the container through the outlet port.

It is also contemplated the check valve 54 or an additional check valve, can be located within the discharge conduit 60. The check valve in the discharge conduit 60 can be selected to preclude flow from the discharge conduit to the container 20. If only a single check valve is employed, and the check valve is located in the discharge conduit 60, then the outlet port 52 typically includes a cap or stopper.

Figure 19:
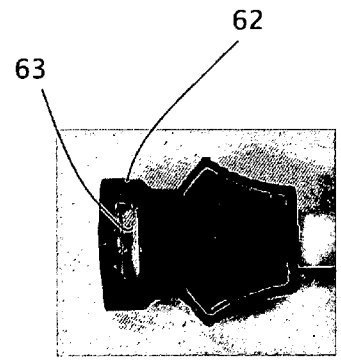
FIG. 19 is a cross sectional view of the portion of the discharge conduit for engaging the pump assembly.

In one configuration, the failure of the connection between the discharge conduit 60 and the outlet port 52, renders the discharge conduit 60 inoperable for reconnection to the outlet port. For example, as seen in FIGS. 19 and 82, an outer surface of the outlet port 52 includes a male barb 51 and the corresponding portion of the discharge conduit 60 includes a resilient shroud 62 having a female aperture 63 for engaging the male barb 51. Upon a loading greater than the predetermined failure loading, either the male barb 51 can fracture or the female aperture 63 on the shroud 62 can rupture, thereby allowing separation and precluding reassembly.

The discharge conduit 60 can have any of a variety of lengths such as 1 foot, 2 feet, 3 feet or more. It has been found advantageous to form the discharge conduit 60 of a flexible section 66 and a more rigid, self-supporting section 68. The rigid section 68 can be linear, angular or curvilinear. In such configuration, the flexible section 66 extends from the outlet port 52 of the container 20, and the rigid section 68 extends from the flexible portion to a terminal end, or discharge port 70, of the discharge conduit 60. A discharge nozzle 76 can be located at the discharge port 70 for selectively controlling a discharge pattern from the fluid dispensing system 10. The discharge nozzle 76 can be configured to provide an adjustable discharge pattern ranging from a stream to a conical or fan like a pattern.

Figure 10:
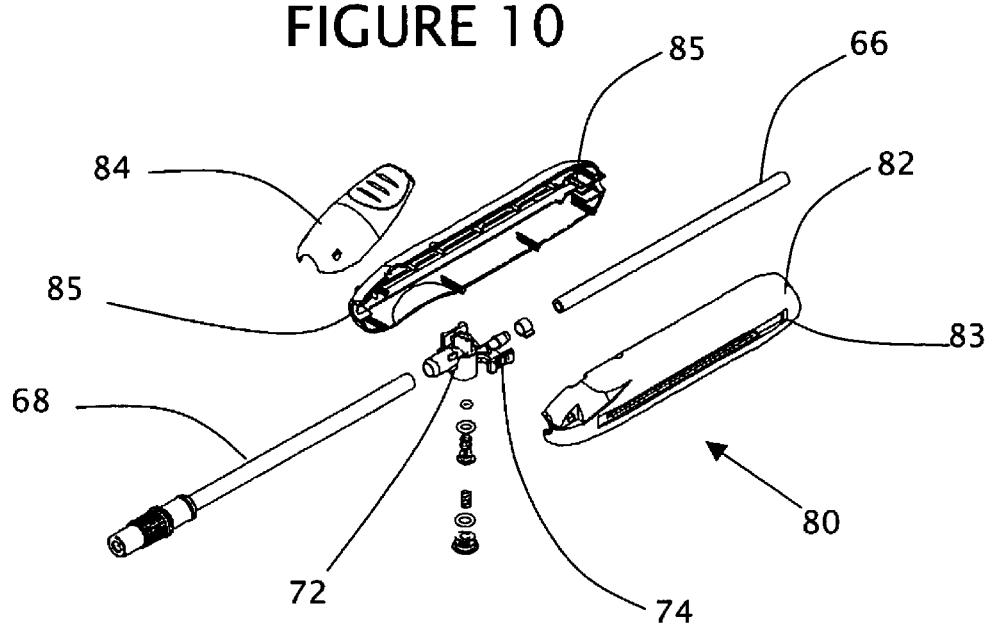
FIG. 10 is an exploded perspective view of the wand assembly of FIG. 9.

The discharge conduit 60 also includes a dispensing valve 72 along a length of the conduit. The dispensing valve 72 is normally biased to a closed (no flow) position. The dispensing valve 72 can be any of a variety of valves known in the industry. The dispensing valve 72 can be located in the flexible section 66, the rigid section 68 or the junction between the flexible section and the rigid section of the discharge conduit 60. As seen in FIG. 10, the dispensing valve 72 forms a junction between the flexible section 66 and the rigid section 68 of the discharge conduit 60. In addition, the connection of the respective section of the discharge conduit 60 to the dispensing valve 72 can be releasable or permanent. The permanent connection can be accomplished by sizing of the respective components, a subsequent bonding operation such as ultrasonic welding, or the use of a bonding agent such as an adhesive.

Referring to FIGS. 64 and 72-78, the dispensing valve 72 is shown, wherein in FIGS. 72-78, the poppet, spring and seals are not shown. The poppet, spring and seals are shown in the exploded view of FIG. 64.

Referring generally to FIG. 10, the wand assembly 80 includes a grip body 82 slideably connected to the discharge conduit 60 between a retracted, storage position and an extended, application position. Thus, the grip body 82 moves relative to the dispensing valve 72.

The grip body 82 includes a trigger 84, movable between a retracted position and an actuating position. Upon the grip body 82 being disposed in the retracted position, the trigger 84 is not aligned with the dispensing valve 72. Upon the grip body 82 being disposed in the extended position, the trigger 84 is operably aligned with the dispensing valve 72.

The grip body 82 and the discharge conduit 60 can include cooperating indicia for providing visual confirmation of the position of the grip body, and hence trigger 84, relative to the dispensing valve 72. The visual confirmation is selected to permit an operator to readily determine whether the grip body 82 is in the extended (actuating) position or the retracted (inoperable) position. For example, the grip body 82 can include an aperture 83 through which a portion of the discharge conduit 60 is visible and the discharge conduit can include a first colored portion aligned with the aperture in the retracted position and a different second color portion aligned with the aperture in the extended position. Alternatively, as seen in FIG. 10, the dispensing valve 72 or a portion of the discharge conduit 60 can include a tab 74 which slides relative to the grip body 82 for indicating the status of the grip body (and hence trigger 84). Referring to FIGS. 72-78, the dispensing valve 72 can include a compression spring biasing the tab 74 outward to a position that engages corresponding recess or aperture in the grip body 82. However, it is also contemplated the tab 74 can be formed of sufficiently resilient polymer to be biased into the corresponding recess in the grip body, thereby "locking" into the designed location. Thus, as the dispensing valve 72 is moved to either of the operable and inoperable position, the tab 74 seats into a corresponding recess in the grip body 82 to reduce unintended movement of the dispensing valve 72 relative to the grip body. That is, a detent mechanism is provided between the dispensing valve 72 relative to the grip body 82.

Figure 11:
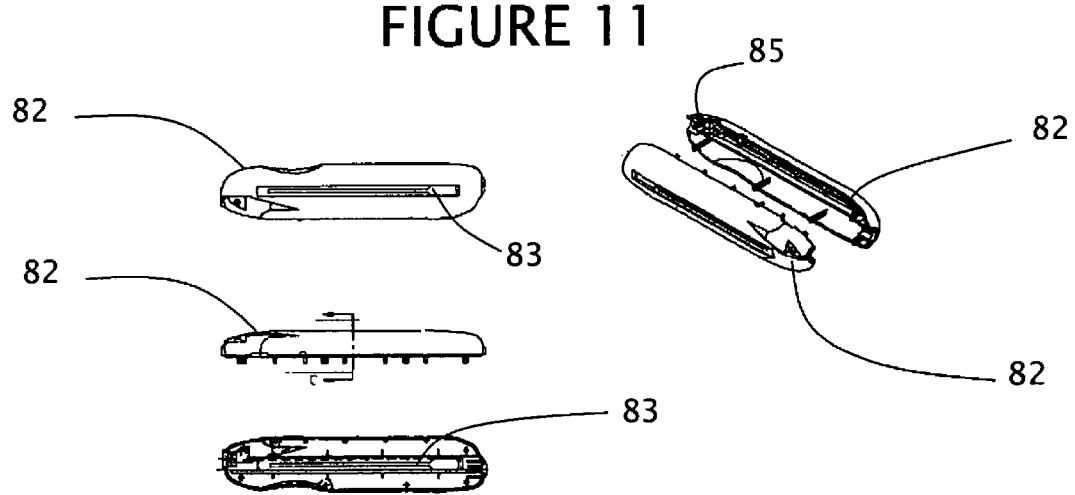
FIG. 11 is a side elevational view of a portion of the grip body.
Figure 15:
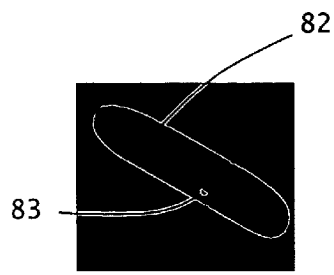
FIG. 15 is a perspective view of an alternative configuration of the grip body.
Figure 16:
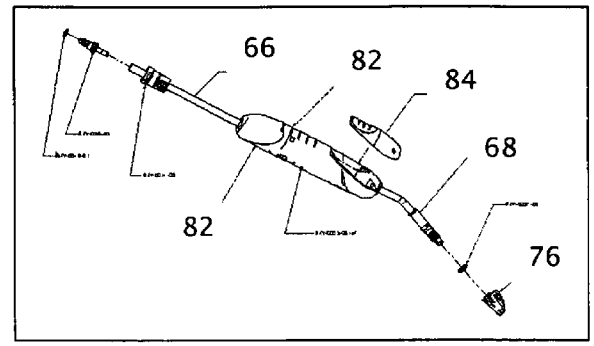
FIG. 16 is an exploded view of an alternative wand assembly incorporating the grip body of FIG. 15.

Generally, referring to FIGS. 10 and 11, the grip body 82 is formed by a pair of mating halves which are snapped or bonded together to form a passageway 85 for slideably receiving a length of the discharge conduit 60. The passageway 85 within the grip body 82 for receiving a length of the discharge conduit 60 has a corresponding configuration to the rigid section 68 of the discharge conduit.

Referring to FIGS. 64-71, the grip body 82 can be formed of mating halves having a separation line transverse to the longitudinal dimension of the conduit 60. In this configuration, the grip body 82 has an upstream portion and a downstream portion, which define the pathway 85.

The grip body 82 defines mating or engaging surfaces 88, which are typically formed with relative precision (narrow tolerances). Thus, an advantageous manufacture of the grip body 82 includes injection molding, which can provide the necessary precision.

The trigger 84 is connected to the grip body 82, such as by pivots and can include a bias mechanism, such as coil or leaf springs, or resilient flaps or fingers, for urging the trigger to the off position. The trigger 84 can be located and sized to be thumb, finger, fingers or palm manipulated.

In one configuration, the dispensing valve 72 forms the junction between the flexible section 66 of the discharge conduit 60 and the rigid section 68 of the discharge conduit. As seen in FIGS. 12-14, the tabs 74 on the dispensing valve 72 can be contacted by the operator for assisting in moving the dispensing valve (and hence discharge conduit 60) relative to the grip body 82.

In an alternative configuration, the trigger 84 can be coupled to the dispensing valve 72, so that the trigger moves with the valve relative to the grip body 82. In such configuration, it is contemplated the grip body 82 includes an interlock member that precludes actuation of the trigger when the dispensing valve 72 (and trigger) are in the inoperative, storage or transport state. The interlock member can include a flange, tab or arm that sits within the path of the trigger 84 to prevent the trigger from moving to an actuating position.

The coupler module 100 operably connects the wand assembly 80 to the container 20. In selected configurations, the coupler module 100 is connected to the container 20 by a single one-way connection, which substantially precludes nondestructive separation.

Figure 17:
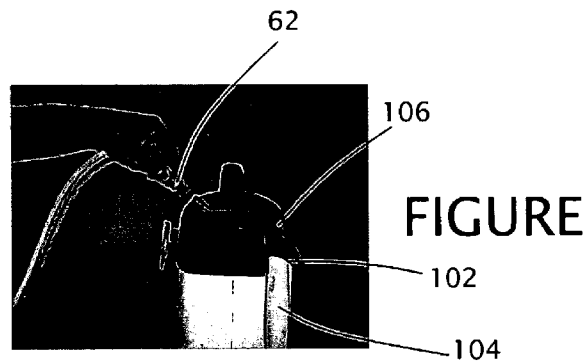
FIG. 17 is a view of the discharge conduit being attached to the pump assembly.
Figure 18:
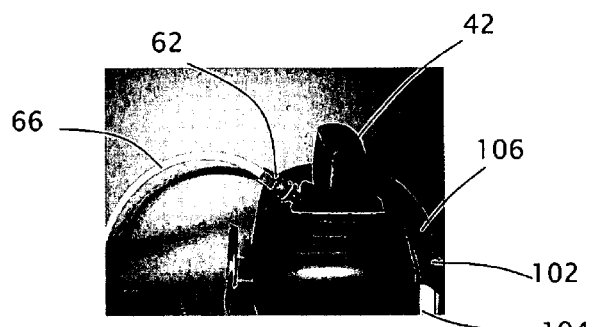
FIG. 18 is a view of the discharge conduit attached to the pump assembly.

The coupler module 100, in cooperation with the grip body 82, provides for the releasable connection to the grip body and hence the wand assembly 80 relative to the container. It has been found advantageous for the coupler module 100 to provide for the friction retention of the wand assembly 80, such as by detents or configured mating surfaces 102 as seen in FIGS. 17 and 18. Thus, the coupler module 100 includes relatively narrow tolerance mating surface 102, such as those readily formed by injection molding for releasably retaining the grip body 82 relative to the coupler module.

In addition, the coupler module 100 includes a projecting surface or feature 104 permitting cooperative engagement with the wand assembly 80 (the grip body 82) only in the retracted, inoperable, configuration of the grip body relative to the dispensing valve 72. That is, the wand assembly 80 cannot be attached to the coupler module 100 if the trigger 84 is operably aligned with the dispensing valve 72. Further, the coupler module 100 includes a contact surface 106, such as a projecting finger as seen in FIGS. 39, 40, 42-44 and 79-81 for engaging a keyway 86 in the grip body 82 or the discharge conduit 60 to preclude movement of the grip body relative to the discharge conduit during operable engagement of the grip body and the coupler module. It has contemplated the mating surface 102 can be configured to provide the engagement of the grip body 82 only in the retracted position as well as preclude movement of the grip body relative to the discharge conduit 60. Thus, the contact surface 106 can be incorporated into the mating surface 102. In the configuration employing the finger 106 and the keyway 86, the grip body 82 can only be connected to the coupler module 100 with the discharge nozzle 76 in a downwardly pointing direction.

In addition, the coupler module 100 can include a bracket or arm 110 sized to releasably retain the flexible section 66 of the discharge conduit 60. The bracket 110 includes a conduit engaging section that provides for the releasable retention of the flexible section 66 of the discharge conduit 60. As seen in FIG. 45, the coupler module 100 can include an elliptical profile on the arm 110 to allow a longer length of the conduit 60 (particularly the flexible section 66) to engage the coupler module. Thus, a greater length of the flexible section 66 of the conduit 60 contacts the coupler module 100, than with a circular seat.

The coupler module 100 can have any of a variety of configurations. For example, the coupler module 100 can be configured as a skirt which engages the container 20. In the skirt configuration of the coupler module 100, the coupler module includes an aperture 111 sized to receive the neck 22 of the container 20. The coupler module 100 further includes a plurality of tangs or teeth 112 which engage the shoulder 26 on the container 20. As the teeth 112 are disposed between the skirt and the container 20, access to the teeth is generally precluded, thereby providing substantially nondestructive separation of the coupler module 100, as a skirt, to the container.

A further configuration, as seen in FIGS. 1-3 and 32-52, the coupler module 100 has a generally bracket configuration which in turn engages a non-precision skirt 120. That is, the non-precision skirt 120 does not include the surfaces for engaging and retaining the wand assembly 80, and can thus be formed by low cost methods of manufacture, such as blow molding. In this configuration, the coupler module 100 again provides the engaging and retaining surfaces for releasably retaining the wand assembly 80. In addition, this configuration of the coupler module 100 can include the bracket 110 to retain a length of the flexible section of the discharge conduit 60. The bracket configuration of the coupler module 100 includes a locking surface for engaging a corresponding surface on the skirt 120. Alternatively, it is understood the coupler module 100 can include projecting tangs which can pass through corresponding slots or apertures in the non-precision skirt 120 such that a portion of the tang is disposed between the skirt and the container 20. In either construction, nondestructive separation of the coupler module 100 from the non precision skirt 120, and hence from the container 20 is substantially precluded. Further referring to FIGS. 32-38 and 46-52, the non-precision skirt 120 can include a scalloped or concave area adjacent the neck 22 of the container 20. Also referring to FIGS. 32-38 and 46-52, the non precision skirt 120 has a vertical dimension (extends towards the bottom of the container 20) sufficient to cover an upper portion of the container. Specifically, in one configuration the non-precision skirt 120 depends to overlie areas of the container 20 typically susceptible to flexing during pressurization and depressurization. By covering the areas of normal flexing, user perception of the system 10 is enhanced.

Figure 4:
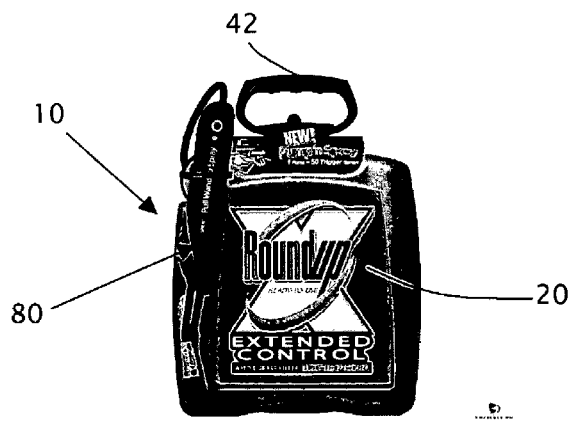
FIG. 4 is a side elevational view of a further configuration of the fluid dispensing system.
Figure 5:
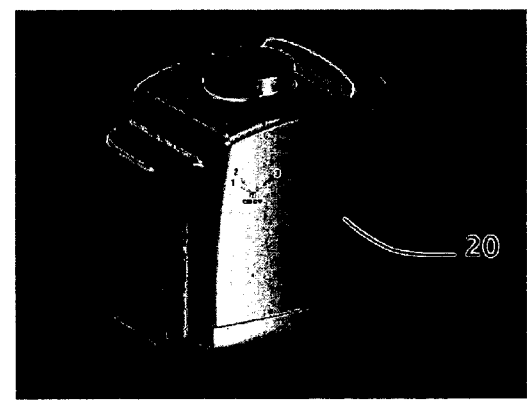
FIG. 5 is a perspective view of a configuration of the container of FIG. 4.
Figure 6:
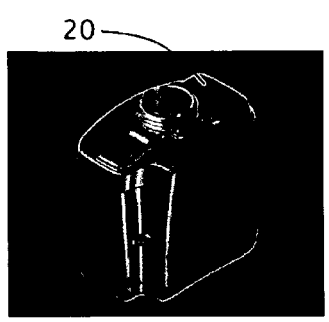
FIG. 6 is a left front perspective view of a further configuration of the container.
Figure 7:
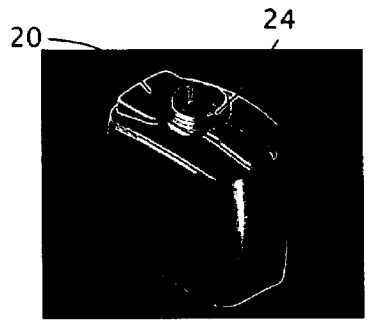
FIG. 7 is a right front perspective view of the container of FIG. 6.
Figure 8:
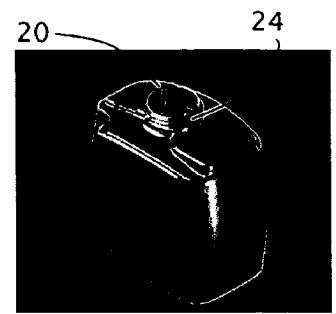
FIG. 8 is a left rear perspective view of the container of FIG. 6.
Figure 9:
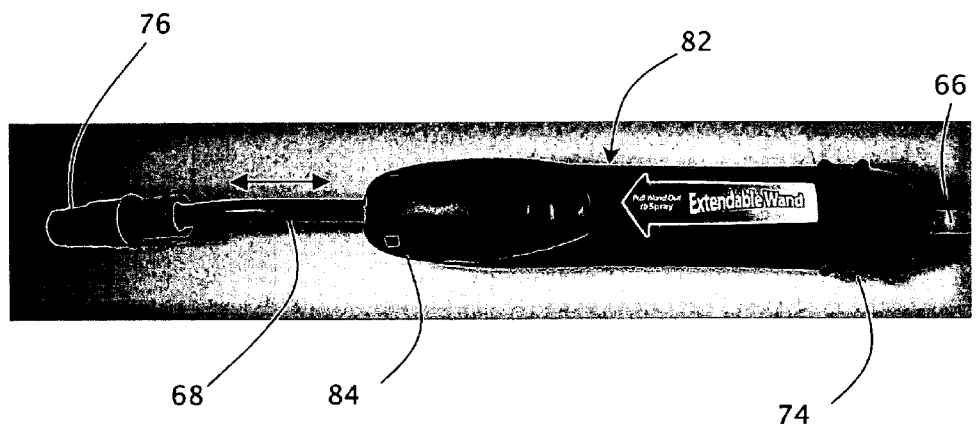
FIG. 9 is a top plan view of the wand assembly.

In a further configuration, as seen in FIG. 4, the coupler module 100 can directly connect to the container 20. In this configuration, the container 20 can include an area of increased thickness which includes recess slots or keyways. The coupler module 100 includes projections or tangs 114 having a catch or tooth sized to be received within the recesses, which substantially preclude non destructive separation. As before, the coupler module 100 provides the engaging and retaining surfaces for cooperating with the wand assembly 80 and the bracket 110 for retaining a length of the discharge conduit 60.

In the manufacture, distribution and use of the fluid dispensing system 10, it is contemplated the container 20 is blow molded at a given facility. The coupler module 100, the pump assembly 40 and the grip body 82 can be fabricated at a separate facility or facilities providing for relatively narrow manufacturing tolerances such as injection molding facilities.

Depending upon the configuration of the coupler module 100, the coupler module can be cooperatively engaged with to the container 20 before or after filling of the container. In addition, it is contemplated the discharge conduit 60 is not connected to the outlet port 52, until such connection is made by the operator. Upon filling the container 20, the pump assembly 40 is disposed within the container and connected to the container to form a sealed interface. Thus, the liquid in the container 20 is retained by the sealed pump assembly 40 and the check valve 54 in the outlet port 52.

After purchase of the fluid dispensing system 10, the operator connects the discharge conduit 60 to the outlet port 52, thereby displacing the check valve 54 and permitting fluid communication between the dispensing valve 72 and the liquid in the container (via the dip tube). Actuation of the pump assembly 40 will pressurize the liquid in the container 20. However, the pressurized liquid cannot be dispensed until the grip body 82 is cooperatively aligned with the discharge conduit 60 to allow actuation of the trigger 84 to dispose the dispensing valve 72 into the flow position. Therefore, the wand assembly 80 must be disengaged from the coupler module 100 and the grip body 82 moved relative to the discharge conduit 60 to maximize spacing between the grip body and the terminal end 70 of the discharge conduit 60 before liquid can be dispensed.

If, during use, greater than the predetermined force is exerted upon the engagement of the discharge conduit 60 and the outlet port 52, the connection of the discharge conduit 60 and the outlet port fails, thereby permitting the check valve 54 to move to the sealed position precluding further discharge of pressurized liquid from the container 20.

Upon completion of a given application of the liquid, the grip body 82 is moved to the retracted position, thereby precluding operable engagement of the trigger 84 and the dispensing valve 72. The grip body 82 can then be engaged with the coupler module 100 to retain the wand assembly 80 relative to the container 20, as well as preclude unintended movement of the grip body to the operable position relative to the dispensing valve 72.

The present construction of the fluid dispensing system 10 provides a number of advantages. For example, as the discharge conduit 60 includes a rigid portion 68, the liquid being dispensed through the discharge nozzle 76 is spaced from the hand of the operator as the operator engages the grip body 82. The rigid portion 68 of the discharge conduit 60 maintains the separation between the emission of the liquid at the discharge nozzle 76 and the hand of the operator on the grip body 82. As the grip body 82 can be slid relative to the discharge conduit 60, the effective combined length of the rigid portion 68 of the discharge conduit 60 and the grip body 82 can be decreased by a length substantially equal to the length of the grip body. This feature, in combination with the engagement of the grip body 82 and the coupler module 100 only in the retracted position allows for reduced packaging and shelving size requirements of the fluid dispensing system 10. In one configuration, the combined length of the rigid portion 68 of the discharge conduit 60 and the grip body 82 in a retracted position, have a height of approximately that of the container 20, or a diagonal of the container.

In addition, as the coupler module 100 precludes movement of the grip body 82 relative to the discharge conduit 60 to the operable position, inadvertent or intended actuation of the trigger 84 will not result in discharge of liquid when the wand assembly 80 is engaged with the coupler module. That is, in order for the dispensing valve 72 to be actuated by the trigger 84 on the grip body 82, the grip body must be removed from the coupler module 100 and the grip body and rigid portion 68 of the discharge conduit 60 must be in the extended position. This reduces the potential for operator contact with the liquid. The dispensing system 10 further provides operable engagement of the wand assembly 80 and the coupler module 100 in only a single orientation. That is, the cooperating surfaces of the wand assembly 80 and the coupler module 100 allow the grip body 82 to engage the coupler module only with the discharge port 70 in a downwardly pointed orientation, thereby further reducing the incidence of unintended contact with the liquid to be dispensed. Since the dispensing valve 72 is inoperative upon engagement of the wand assembly 80 and the coupler module 100 it is difficult for the user to unintentionally dispense material in an upward direction when the wand assembly is engaged with the coupler module.

Further, as the effective length of the rigid portion 68 of the discharge conduit 60 can be decreased by sliding the grip body 82 relative to the discharge conduit, without changing the volume of the discharge conduit, a residual pressure in the system 10 is not generated.

The use of the coupler module 100 having relatively precise surfaces (narrow tolerances) for engaging the corresponding surfaces of the grip body 82 allows for formation of the container 20 by the relatively inexpensive blow molding process. Further, the coupler module 100 can provide for a sufficiently secure retention of the wand assembly 80 relative to the container 20 during shipping and shelving, so as to maintain the trigger 84 in an inoperable position relative to the dispensing valve 72. Manufacturing costs can be further reduced as the permanent one-time connection of the coupler module 100 to the, or relative to, the container 20 does not require a precision fitting on both components.

It is further contemplated the coupler module 100 and wand assembly 80 can be cooperatively engaged with each other and retained by a tie or wrap, and subsequently engaged with the non precision skirt 120 (or directly to the container 20), while in the tied or retained state. This sub assembly type construction allows for increased efficiency in manufacture of the system 10.

The fluid dispensing system 10 also provides for filling of the container 20 with the liquid to be dispensed prior to purchasing by the consumer (operator). Thus, the consumer does not need to mix chemicals, which can lead to inaccurate applications as well as environmental hazards. Further, containment of the liquid prior to operator initiation is enhanced by the check valve 54 precluding flow from the outlet port 52 and the discharge conduit 60 being disconnected from the pump assembly 40 prior to purchase of the fluid dispensing system 10.

Although the present description is generally set forth in terms of spraying a liquid, it is understood foams, mixtures, and compounds, as well as thixotropic materials can be discharged by the dispensing system 10.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

The invention claimed is:

1. A fluid dispensing system comprising:
    (a) a container;
    (b) a pump assembly connected to the container selectively pressurizing the container, the pump assembly including an outlet port, the outlet port having a check valve precluding flow from the container through the outlet port; and
    (c) a discharge conduit having a single use connector engaging the outlet port and displacing the check valve to a flow position, the single use connector comprising means for failing in response to a predetermined load and precluding operable re-engagement with the outlet in a failed state.

2. The fluid dispensing system of claim 1, further comprising a grip body slideably connected to the discharge conduit between a retracted position and an extended position.

3. The fluid dispensing system of claim 2, wherein the discharge conduit includes a valve operably aligned with the grip body in the extended position.

4. A fluid dispensing system for selectively discharging fluid from a container, the system comprising:
    (a) a discharge conduit fluidly connected to the container, the discharge conduct including a valve;
    (b) a wand assembly having a grip body and a trigger, the wand assembly slideably connected to the discharge conduit between a spray position operably aligning the trigger and the valve, and a storage position precluding operable alignment trigger and the valve; and
    (c) a coupler module releasably retaining the wand assembly in the storage position relative to the container.

5. The fluid dispensing system of claim 4, wherein the coupler module precluding movement of the wand assembly to the spray position.

6. The fluid dispensing system of claim 4, further comprising a skirt connected to the container, wherein the coupler module engages the skirt.

7. The fluid dispensing system of claim 4, wherein the coupler module is directly connected to the container.

8. The fluid dispensing system of claim 4, wherein the coupler module includes a conduit holding bracket.

9. The fluid dispensing system of claim 4, wherein the coupler module includes a skirt overlying a portion of the container.

10. The fluid dispensing system of claim 4, wherein the discharge conduit has a constant length.

11. A fluid dispensing system for selectively dispensing fluid from a container, the system comprising:
(a) a discharge conduit fluidly connected to the container, the discharge conduit having a constant length flow path and terminating at a discharge port;
(b) a grip body slideably connected to the conduit between a storage position locating the discharge port proximal to the grip body and an application position locating the discharge port distal to the grip body; and wherein the discharge conduit includes a valve and the grip body includes a trigger, the trigger operably aligned with the valve with the discharge port distal to the grip body.

12. A method for dispensing fluid from a pressurized container, the method comprising:
(a) sliding a grip body relative to a length of a discharge conduit to align a trigger mechanism connected to the grip body with a valve in the discharge conduit; and
(b) actuating the trigger mechanism to dispose the valve in a flow position.

13. The fluid dispensing system of claim 11, wherein the discharge conduit includes a flexible first section and a more rigid second section.

14. A fluid dispensing system comprising:
(a) a grip body;
(b) a trigger connected to the grip body, said grip body moveable between a retracted position and an actuating position;
(c) a length of discharge conduit slideably connected to the grip body between a storage position and a spray position; and
(d) a valve connected to the discharge conduit and selectively precluding flow through the discharge conduit, the valve moveable with the discharge conduit between the storage position inoperably aligned with the trigger and the spray position operably aligned with the trigger.

15. The sprayer shut off assembly of claim 14, wherein grip body includes a viewing port providing visual confirmation of location of valve relative to the grip body.

16. A fluid dispensing system comprising:
(a) a trigger;
(b) a discharge conduit; and
(c) a valve connected to the discharge conduit to preclude/permit flow through the discharge conduit; the discharge conduit and the valve slideably moveable relative to the trigger between an operable position aligning the trigger and the valve, and a storage position precluding actuation of valve by the trigger.

17. The fluid dispensing system of claim 16, further comprising a grip body connected to the trigger.

18. A fluid dispensing system comprising:
(a) a blow molded container;
(b) a pump assembly partially disposed in the container and including an outlet port, the outlet port fluidly connected to a check valve;
(c) a discharge conduit having a rigid section and a flexible section, the flexible section connected to the outlet port and displacing the check valve;
(d) a dispensing valve in the discharge conduit; and
(e) a grip body slideably connected to the discharge conduit to operably align a trigger with the dispensing valve.

* * * * *